United States Patent
Wakana et al.

(10) Patent No.: US 12,544,087 B2
(45) Date of Patent: Feb. 10, 2026

(54) SURGICAL INSTRUMENT UNIT, FORCE DETECTION DEVICE, AND SURGERY SUPPORT SYSTEM

(71) Applicant: Sony Group Corporation, Tokyo (JP)

(72) Inventors: Kazuhito Wakana, Tokyo (JP); Hiroyuki Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 526 days.

(21) Appl. No.: 17/799,279

(22) PCT Filed: Jan. 19, 2021

(86) PCT No.: PCT/JP2021/001738
§ 371 (c)(1),
(2) Date: Aug. 12, 2022

(87) PCT Pub. No.: WO2021/186882
PCT Pub. Date: Sep. 23, 2021

(65) Prior Publication Data
US 2023/0073791 A1  Mar. 9, 2023

(30) Foreign Application Priority Data

Mar. 16, 2020 (JP) .................................. 2020-045836

(51) Int. Cl.
*A61B 17/29* (2006.01)
*A61B 90/50* (2016.01)
(Continued)

(52) U.S. Cl.
CPC .............. *A61B 17/29* (2013.01); *A61B 90/50* (2016.02); *A61B 2017/00398* (2013.01);
(Continued)

(58) Field of Classification Search
CPC ... A61B 17/29; A61B 90/06; A61B 2090/064; A61B 2090/065; A61B 34/30;
(Continued)

(56) References Cited

U.S. PATENT DOCUMENTS 8,845,197 B2 * 9/2014 Hasenzahl ............. A61B 90/06
433/114
9,869,597 B1 * 1/2018 Reich .................... G01L 5/1627
(Continued)

FOREIGN PATENT DOCUMENTS

CN      109567946 A    4/2019
EP      2959842 A1    12/2015
(Continued)

OTHER PUBLICATIONS

International Search Report and Written Opinion mailed on Apr. 6, 2021, received for PCT Application PCT/JP2021/001738, filed on Jan. 19, 2021, 11 pages including English Translation.

*Primary Examiner* — Eric J Rosen
(74) *Attorney, Agent, or Firm* — XSENSUS LLP

(57) ABSTRACT

A surgical instrument unit includes a shaft having an end effector at the tip end, a hollow base, and a strain generating part that supports a root part of the shaft in the base. The strain generating part has a first-layer strain generating body and a second-layer strain generating body arranged in order in a long axis direction of the shaft, each of the first-layer strain generating body and the second-layer strain generating body including a multidirectional strain generating body supporting a root part of the shaft with a plurality of legs. The first strain generating body is inclined by a predetermined angle θ with respect to a plane orthogonal to a long axis of the shaft, and the second strain generating body is inclined by an angle −θ opposite to each leg of the first strain generating body with respect to the plane.

9 Claims, 33 Drawing Sheets

(51) Int. Cl.
  *A61B 17/00* (2006.01)
  *A61B 34/30* (2016.01)
  *A61B 34/37* (2016.01)
  *A61B 90/00* (2016.01)

(52) U.S. Cl.
  CPC . *A61B 2017/2902* (2013.01); *A61B 2034/301* (2016.02); *A61B 34/37* (2016.02); *A61B 2090/064* (2016.02)

(58) Field of Classification Search
  CPC ......... A61B 34/37; A61B 34/70; A61B 34/76; A61B 2034/2061; A61B 2562/0261; A61B 2562/0266; G01L 5/16; G01L 5/22; G01L 5/0061; G01L 5/0076; G01L 1/246

See application file for complete search history.

(56) References Cited

U.S. PATENT DOCUMENTS

| | | | |
|---|---|---|---|
| 2011/0082476 A1* | 4/2011 | Furnish | A61B 17/0469 606/144 |
| 2015/0164598 A1* | 6/2015 | Blumenkranz | G01L 1/246 606/130 |
| 2015/0374449 A1* | 12/2015 | Chowaniec | A61B 90/06 606/1 |
| 2019/0357988 A1* | 11/2019 | Abbott | A61B 34/35 |
| 2020/0093487 A1* | 3/2020 | Baber | H02J 1/10 |

FOREIGN PATENT DOCUMENTS

| | | |
|---|---|---|
| EP | 3366229 A1 | 8/2018 |
| JP | 2007-187596 A | 7/2007 |
| JP | 2009-522016 A | 6/2009 |
| JP | 2009-195489 A | 9/2009 |
| JP | 2011-208963 A | 10/2011 |
| WO | 2018/042571 A1 | 3/2018 |
| WO | 2018/163680 A1 | 9/2018 |

\* cited by examiner

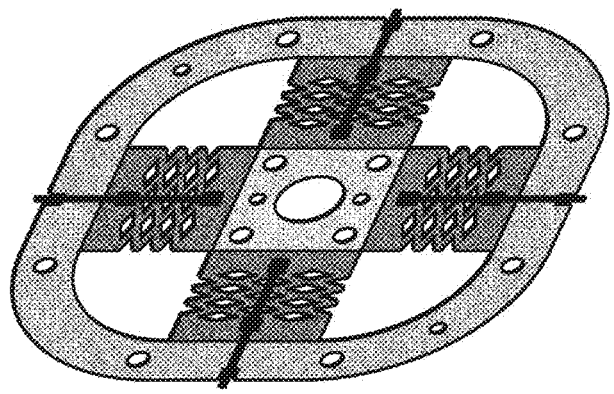
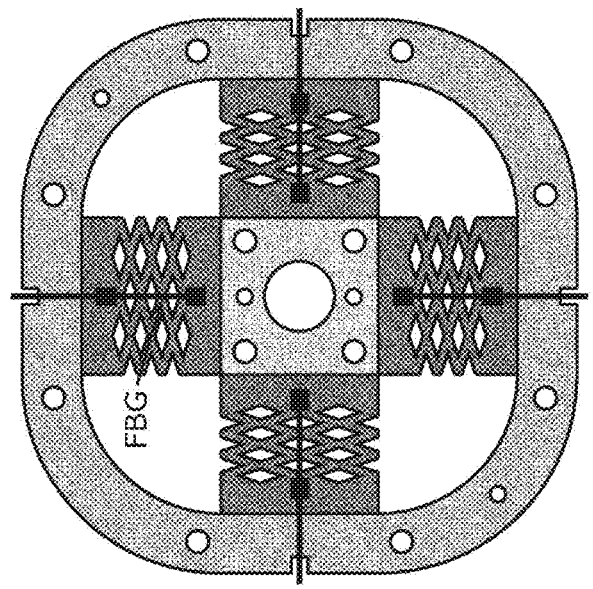
FIG. 27

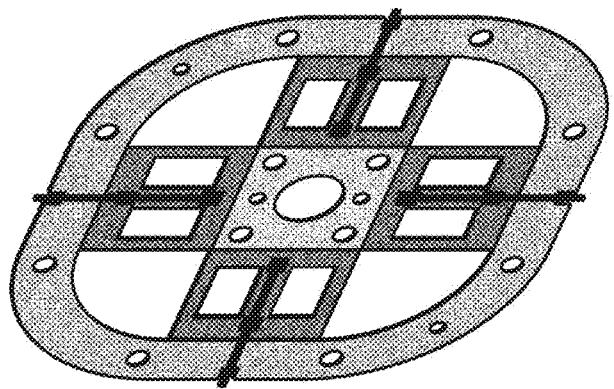
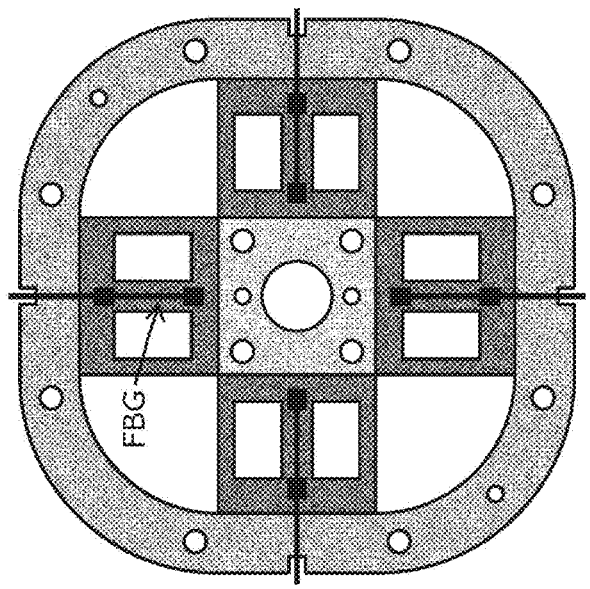
FIG. 28

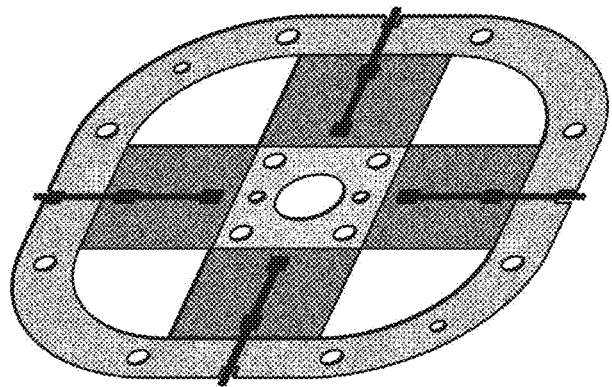
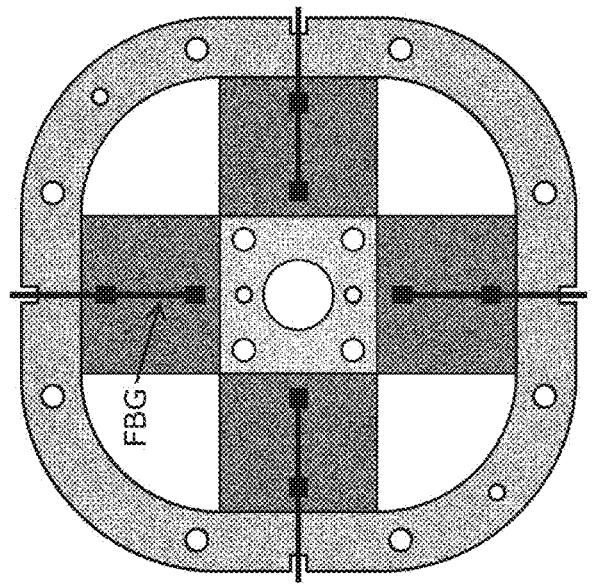
FIG. 29

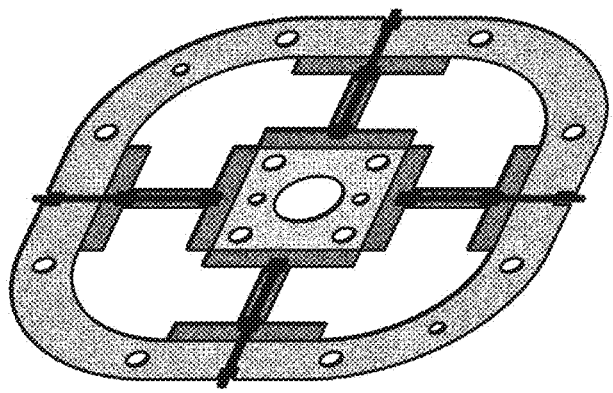
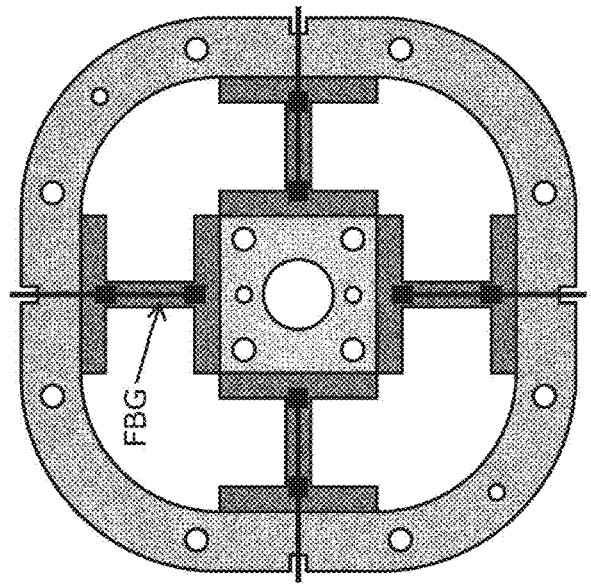
FIG. 30

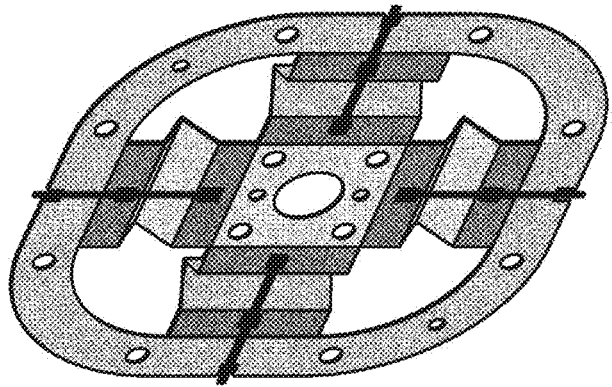
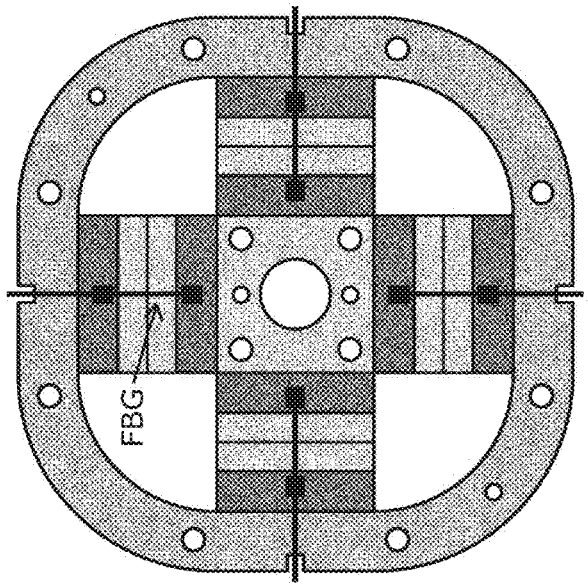
FIG. 31

SURGICAL INSTRUMENT UNIT, FORCE DETECTION DEVICE, AND SURGERY SUPPORT SYSTEM

CROSS-REFERENCE TO RELATED APPLICATIONS

The present application is based on PCT filing PCT/JP2021/001738, filed Jan. 19, 2021, which claims priority to JP 2020-045836, filed Mar. 16, 2020, the entire contents of each are incorporated herein by reference.

TECHNICAL FIELD

A technology disclosed in the present specification (hereinafter referred to as "present disclosure") relates to a surgical instrument unit applied to a surgical robot, for example, and having an external force detection function, a force detection device, and a surgery support system.

BACKGROUND ART

In a master-slave surgical robot, a technology has been proposed in which an external force (e.g., external force received on tip end of surgical instrument from affected part) acting on an end effector is detected and fed back to an operator who operates on the master side in order to improve safety and operability (see Patent Document 1, for example). Additionally, in order to achieve multiple degrees of freedom at the tip end while maintaining the small diameter of the surgical instrument (tip end multi-degree-of-freedom end effector), it is effective to use a cable drive system in which the driving force of an actuator at the base is transmitted to an output shaft at the tip end by a plurality of cables (wires).

If a force sensor is mounted on the root side of a cable drive in order to sense the force applied to the tip end of the surgical instrument, there is a possibility that the inertial force is added to the measurement value of the force sensor as noise during the motion of the arm due to the large weight of the force sensor. Additionally, if a force sensor is mounted on a gripper part of the end effector, it is necessary to provide electric wiring and optical fiber up to the gripper part. As a result, the movable range of the tip end is likely to be hindered. For example, it is possible to avoid the above problem if force can be sensed in a shaft part of the cable drive device. However, when a strain sensor is simply arranged around the shaft, it is difficult to measure the external force accurately because interference occurs between the external force and tension caused by the plurality of cables.

CITATION LIST

Patent Document

Patent Document 1: WO2018/163680

SUMMARY OF THE INVENTION

Problems to be Solved by the Invention

An object of the present disclosure is to provide a surgical instrument unit that is applied to a surgical robot and has an external force detection function not interfered by tension of a cable, a force detection device, and a surgery support system.

Solutions to Problems

A first aspect of the present disclosure is
a surgical instrument unit including:
a shaft having an end effector at a tip end;
a hollow base; and
a strain generating part that supports a root part of the shaft in the base.

The shaft allows passage of a cable for driving the end effector, and a motor that pulls the cable is arranged in the base.

The strain generating part has a first-layer strain generating body and a second-layer strain generating body arranged in order in a long axis direction of the shaft, each of the first-layer strain generating body and the second-layer strain generating body including a multidirectional strain generating body supporting a root part of the shaft with a plurality of legs. The first strain generating body is inclined by a predetermined angle $\theta$ with respect to a plane orthogonal to a long axis of the shaft, and the second strain generating body is inclined by an angle $-\theta$ opposite to each leg of the first strain generating body with respect to the plane.

Additionally, a second aspect of the present disclosure is
a force detection device including
a strain generating part that supports a shaft in a hollow base, and
a strain sensor that detects strain in the strain generating part.

Additionally, a third aspect of the present disclosure is
a surgery support system including
a surgical instrument and an arm to which the surgical instrument is attached, in which
the surgical instrument includes a shaft having an end effector at a tip end, a hollow base, and a strain generating part that supports a root part of the shaft in the base.

Note, however, that the term "system" as used herein refers to a logical assembly of a plurality of devices (or functional modules that implement specific functions), and it does not matter whether or not each device or each functional module is in a single housing.

Effects of the Invention

According to the present disclosure, it is possible to provide a surgical instrument unit having a function of detecting an external force by removing interference due to traction of a wire that drives an end effector, a force detection device, and a surgery support system.

Note that the effects described in the present specification are merely examples, and the effects brought by the present disclosure are not limited thereto. Additionally, the present disclosure may further exhibit additional effects in addition to the above effects.

Still other objectives, features and advantages of the present disclosure will become apparent by more detailed description based on embodiments and accompanying drawings described below.

BRIEF DESCRIPTION OF DRAWINGS

FIG. 27 is a diagram illustrating a configuration example of a strain generating body using a sheet metal.

FIG. 28 is a diagram illustrating a configuration example of a strain generating body using a sheet metal.

FIG. 29 is a diagram illustrating a configuration example of a strain generating body using a sheet metal.

FIG. 30 is a diagram illustrating a configuration example of a strain generating body using a sheet metal.

FIG. 31 is a diagram illustrating a configuration example of a strain generating body using a sheet metal.

MODE FOR CARRYING OUT THE INVENTION

Figure 1:
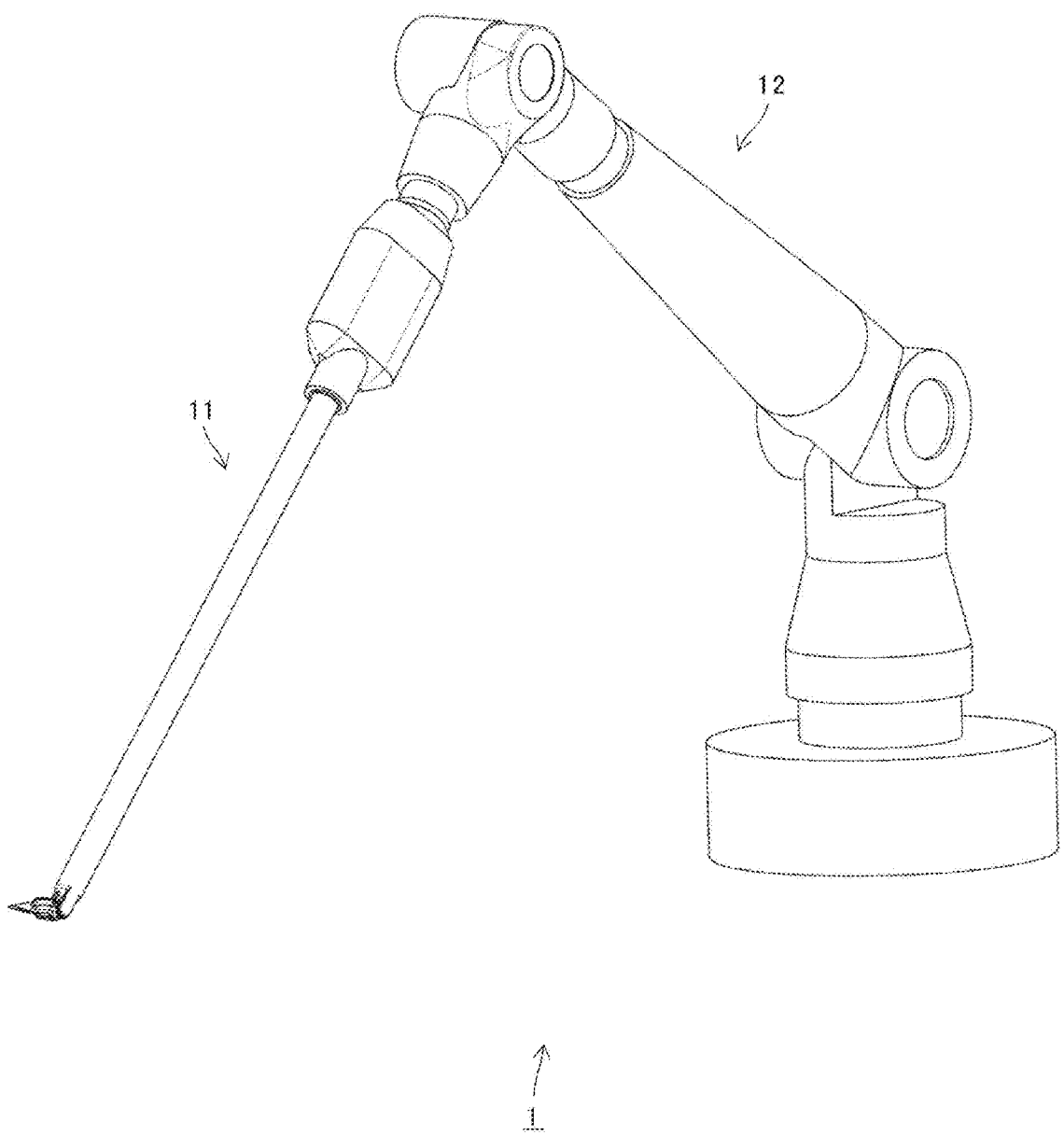
FIG. 1 is a diagram illustrating an external configuration example of a surgery supporting robot 1.

Hereinafter, a technology according to the present disclosure will be described in the following order with reference to the drawings.
A. System configuration
B. Configuration of surgical instrument unit
C. Arrangement of external force detection system
D. Configuration of external force detection system
D-1. Structure of strain generating body
D-2. Strain mode of strain generating body set by external force
D-3 Force estimation equation
E. Mounting example of strain generating body
F. Specific structure and assembling method of surgical instrument unit A. System Configuration FIG. 1 illustrates an external configuration example of a surgery supporting robot 1. The surgery supporting robot 1 illustrated in FIG. 1 includes an arm 12 having a multi-link structure, and a surgical instrument unit 11 is mounted at the tip end of the arm 12. The surgical instrument unit 11 may be replaceable by being detached from the surgery supporting robot 1 or the arm 12. The surgery supporting robot 1 is applied to laparoscopic surgery, for example, and the tip end part of the surgical instrument unit 11 is inserted into the abdominal cavity via a trocar (not illustrated) to perform treatment such as grasping and cutting of an affected part.

The surgery supporting robot 1 illustrated in FIG. 1 may be used as, for example, a slave device in a master-slave system, and the arm 12 and the surgical instrument unit 11 are driven in accordance with a command from a master device (not illustrated). Additionally, the surgery supporting robot 1 can move by being directly operated by the operator as an arm including a surgical instrument.

The arm 12 may be a robot having any type of mechanism such as a polar robot, a cylindrical robot, a cartesian robot, a vertically articulated robot, a horizontally articulated robot, a parallel link robot, or a remote center of motion (RCM) robot. In a case where the surgery supporting robot 1 is intended for use in laparoscopic surgery, from viewpoints of compactness of the mechanism, ease of achieving pivoting at a trocar site, and the like, it is preferable to use, as the arm 12, a vertically articulated arm or an RCM arm in which a remote rotation center is disposed in a position away from the driving rotation center to achieve a pivoting (fixed point) motion.

FIG. 1 illustrates a configuration example of the surgery supporting robot 1 to which only one surgical instrument unit can be attached. However, the surgery supporting robot 1 may be a surgery supporting robot to which a plurality of surgical instrument units can be simultaneously attached to perform laparoscopic surgery.

In a case where the surgery supporting robot 1 is applied to a slave device of a master-slave system, in order for the operator to remotely operate the surgery supporting robot 1 as the slave device accurately and efficiently without damaging the target object using a master device, it is desirable to feed back information such as the position of the arm 12 and external force applied to the surgical instrument unit 11 to the master device.

B. Configuration of Surgical Instrument Unit

Figure 2:
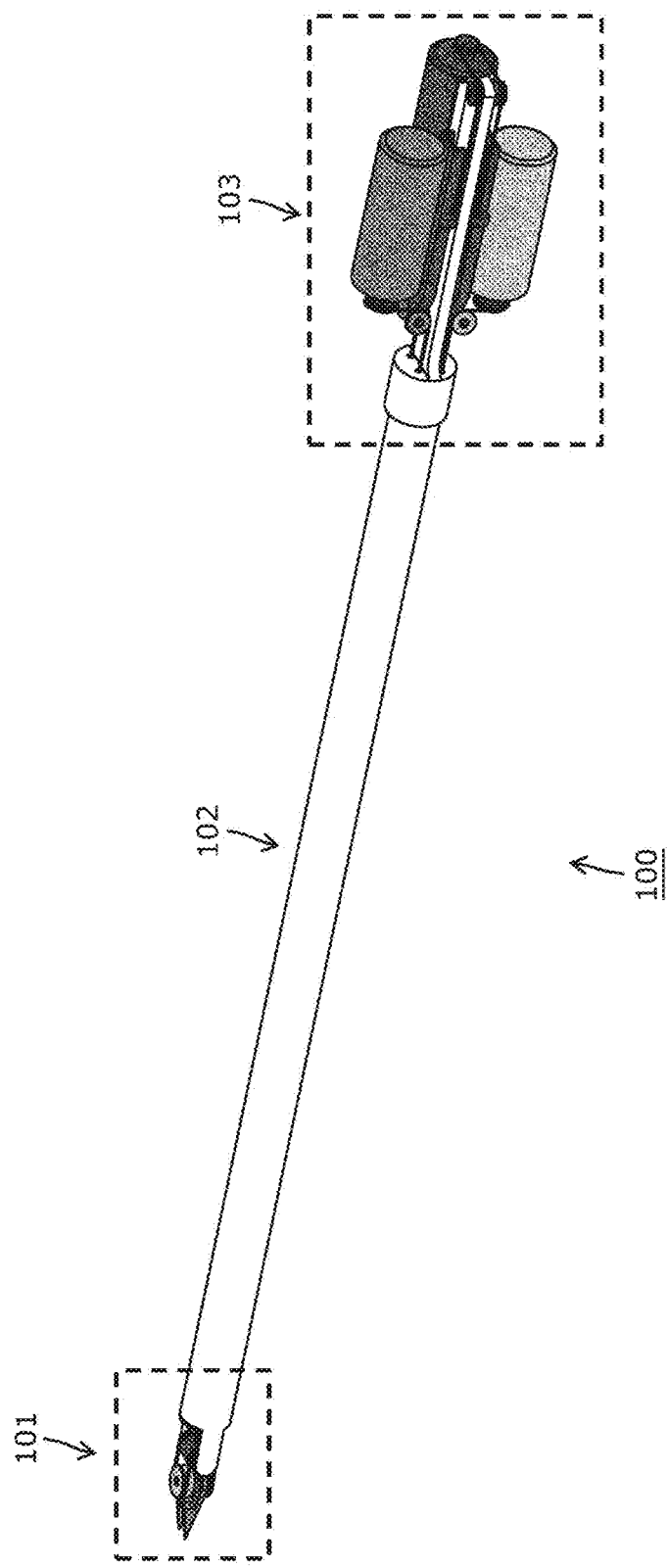
FIG. 2 is a diagram illustrating a configuration example of a surgical instrument unit.

FIG. 2 illustrates a configuration example of a surgical instrument unit applied to the surgery supporting robot 1. A surgical instrument unit 100 illustrated in FIG. 2 includes a hollow shaft 102 having a longitudinal axis, a surgical instrument unit tip end part 101 at one end of the shaft 102, and a surgical instrument unit driver 103 at the other end of the shaft 102. The surgical instrument unit tip end part 101 includes a wrist element that is turnable about a first axis parallel to the yaw axis with respect to the shaft 102, and an end effector that opens and closes with a second axis parallel to the pitch axis as an opening/closing axis at the tip end of the wrist element. The end effector includes a pair of jaw members facing each other that turn about the second axis to open and close. Note, however, that the second axis is arranged at a position offset from the first axis. Additionally, the surgical instrument unit driver 103 includes two actuators that respectively drive the jaw members in the surgical instrument unit tip end part 101 and one actuator that drives the wrist.

Figure 3:
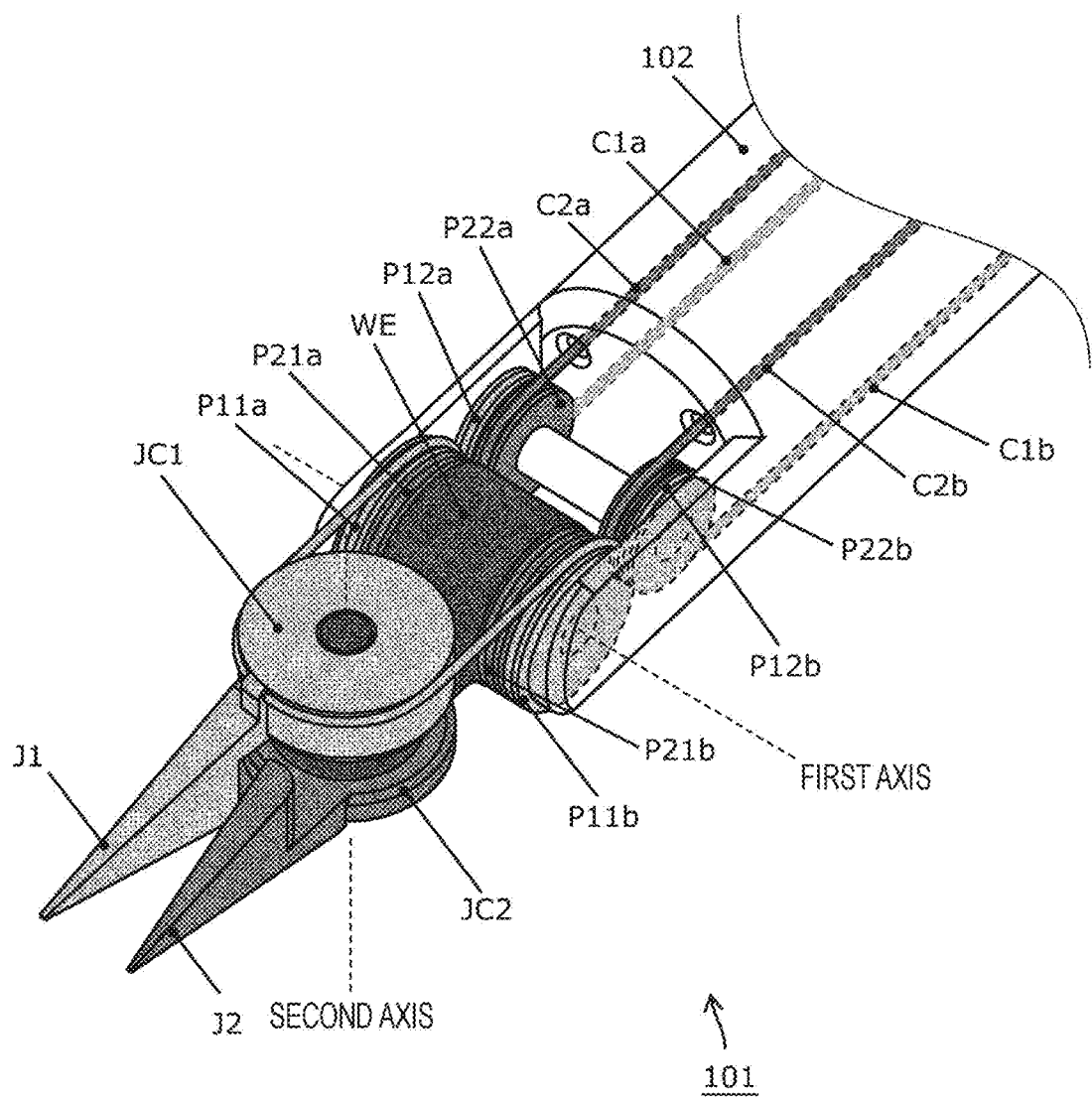
FIG. 3 is an enlarged view of a surgical instrument unit tip end part 101.
Figure 4:
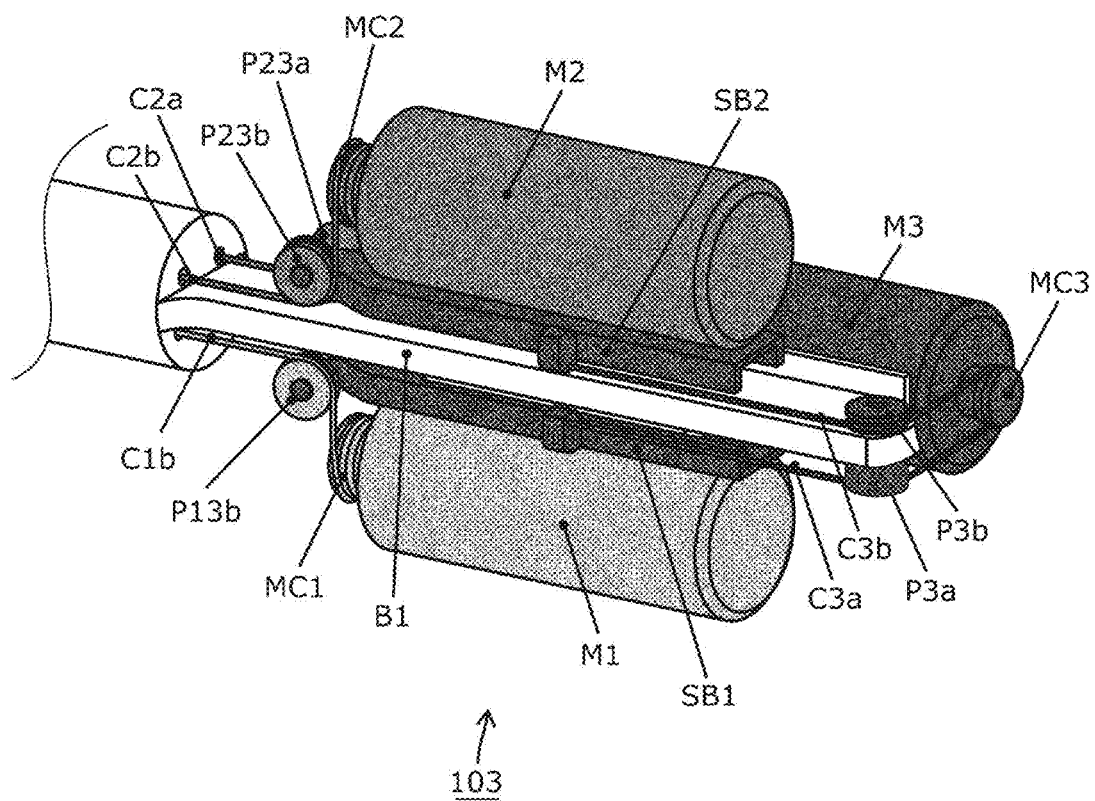
FIG. 4 is an enlarged view of a surgical instrument unit driver 103.
Figure 5:
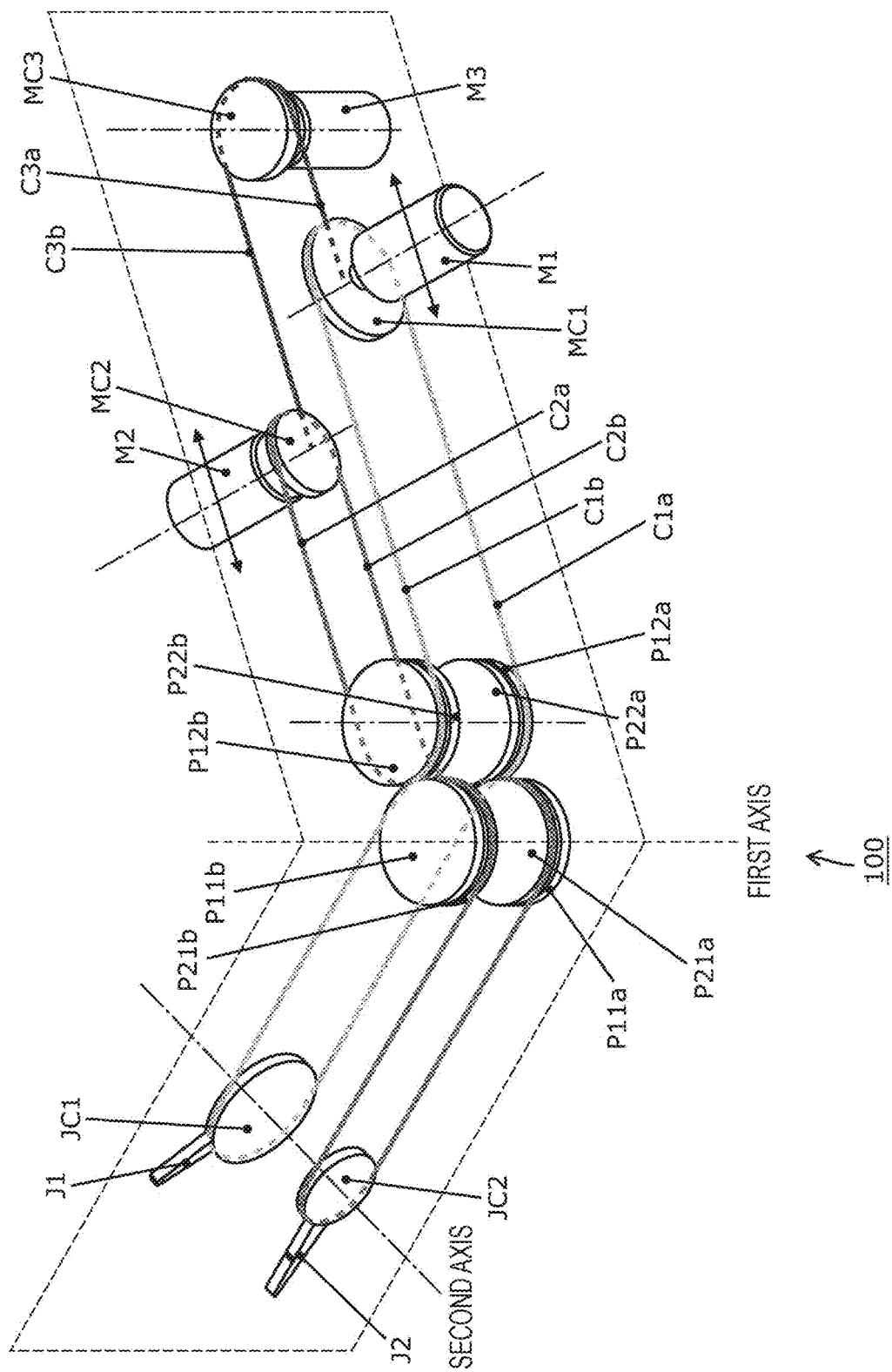
FIG. 5 is a diagram illustrating a freedom degree configuration example of a surgical instrument unit 100.
Figure 6:
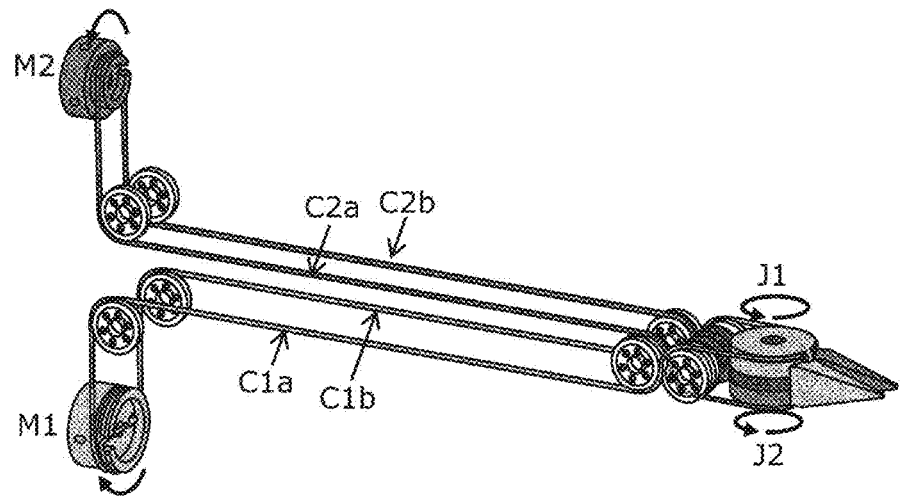
FIG. 6 is a diagram illustrating a simplified freedom degree configuration of the surgical instrument unit 100.

FIG. 3 illustrates the surgical instrument unit tip end part 101 in an enlarged manner. Additionally, FIG. 4 illustrates the surgical instrument unit driver 103 in an enlarged manner. Additionally, FIG. 5 illustrates a freedom degree configuration example of the surgical instrument unit 100. Additionally, FIG. 6 depicts a simplified freedom degree configuration of the surgical instrument unit 100.

The surgical instrument unit tip end part 101 includes a wrist element WE and an open/close end effector. The end effector includes a pair of jaw members of a first jaw member J1 and a second jaw member J2 facing each other (see FIG. 2, for example). The wrist element WE is supported near the root so as to be turnable about the first axis parallel to the yaw axis at the tip end (distal end) of the shaft 102. Additionally, the first jaw member J1 and the second jaw member J2 included in the end effector are supported so as to be turnable about the second axis parallel to the pitch axis at the tip end of the wrist element WE. The first jaw member J1 and the second jaw member J2 are opened and closed by changing an opening angle with the second axis as an opening/closing axis.

Additionally, the surgical instrument unit driver 103 includes a first motor M1 used to drive the first jaw member J1, a second motor M2 used to drive the second jaw member J2, and a third motor M3 used to drive the wrist element WE (see FIGS. 4 and 5, for example). Additionally, first to third motor capstans MC1, MC2, and MC3 as drive capstans are attached to the output shafts of the first to third motors M1 to M3, respectively (see FIG. 6, for example). While it is assumed to use a rotary motor for each of the first to third motors M1 to M3, a motor with a speed reducer may be used.

A first reciprocating cable set C1a and C1b are wound around the first motor capstan MC1, and the first jaw member J1 is driven by a cable loop method by rotating the first motor capstan MC1 by the first motor M1. Additionally, a second reciprocating cable set C2a and C2b are wound around the second motor capstan MC2, and the second jaw member J2 is driven by the cable loop method by rotating the second motor capstan MC2 by the second motor M2.

Referring to FIGS. 4 and 5, the first motor M1 is supported on a first slide base SB1 that slides in the longitudinal axis direction of the shaft 102, and the second motor M2 is supported on a second slide base SB2 that slides in the longitudinal axis direction of the shaft 102. Additionally, a third reciprocating cable set C3a and C3b are wound around the third motor capstan MC3 via third idler pulleys P3a and P3b. The other end of the third outward cable C3a is fixed to the first slide base SB1, and the other end of the third return cable C3b is fixed to the second slide base SB2. Then, by pulling the third reciprocating cable set C3a and C3b by the cable loop method, the third motor M3 can move the first slide base SB1 and the second slide base SB2 forward and backward in opposite directions in the longitudinal axis direction of the shaft 102.

Referring to FIG. 3, the first jaw member J1 is supported by the wrist element WE near the root so as to be turnable about the second axis. Similarly, the second jaw member J2 is supported by the wrist element WE near the root so as to be turnable about the second axis. Therefore, opening and closing of the end effector is achieved by turning each of the first jaw member J1 and the second jaw member J2 about the second axis so that the opening angle between the first jaw member J1 and the second jaw member J2 increases or decreases (i.e., so that difference in angle about second axis between first jaw member J1 and second jaw member J2 changes). Additionally, by simultaneously turning the first jaw member J1 and the second jaw member J2 about the second axis while keeping the opening angle between the first jaw member J1 and the second jaw member J2 constant (i.e., so that sum of angles of first jaw member J1 and second jaw member J2 about second axis changes), turning of the end effector including the first jaw member J1 and the second jaw member J2 about the second axis is achieved.

Referring to FIGS. 3 and 5, a first jaw capstan JC1 having the second axis as the rotation axis is provided near the root of the first jaw member J1. The first reciprocating cable set C1a and C1b are wound around the first jaw capstan JC1. As illustrated in FIGS. 4 and 5, the first reciprocating cable set C1a and C1b are wound around the first motor capstan MC1 on the surgical instrument unit driver 103 side. Therefore, traction acts on one of the cables C1a and C1b depending on the rotation direction of the first motor M1, and turning of the first jaw member J1 about the second axis is achieved. Since the first jaw member J1 is driven by the cable loop method using the first reciprocating cable set C1a and C1b, it is possible to achieve a wide movable range of the first jaw member J1.

Additionally, referring to FIGS. 3 and 5, a second jaw capstan JC2 having the second axis as the rotation axis is provided near the root of the second jaw member J2. The second reciprocating cable set C2a and C2b are wound around the second jaw capstan JC2. As illustrated in FIGS. 4 and 5, the second reciprocating cable set C2a and C2b are wound around the second motor capstan MC2 on the surgical instrument unit driver 103 side. Therefore, traction acts on one of the cables C2a and C2b depending on the rotation direction of the second motor M2, and turning of the second jaw member J2 about the second axis is achieved. Since the second jaw member J2 is driven by the cable loop method using the second reciprocating cable set C2a and C2b, it is possible to achieve a wide movable range of the second jaw member J2.

Next, a layout of the cables in the surgical instrument unit 100 and specific motions of the surgical instrument unit tip end part 101 will be described.

Idler pulleys are used to redirect the first reciprocating cable set C1a and C1b and the second reciprocating cable set C2a and C2b near the first axis to allow the cables to pass through the shaft 102, and also to adjust the layout of the cables in the shaft 102.

As illustrated in FIGS. 3 and 5, the first outward cable C1a is pulled in a direction orthogonal to the second axis, is redirected to a direction orthogonal to the first axis by a first idler pulley P11a having the first axis as the rotation axis, and the layout is adjusted such that the first outward cable C1a is inserted into the shaft 102 by a first adjacent idler pulley P12a adjacent to the first idler pulley P11a and having a rotation axis parallel to the first axis. Then, the first outward cable C1a is inserted into the shaft 102, and then wound around the first motor capstan MC1 via an idler pulley P13a as illustrated in FIG. 4.

On the other hand, the first return cable C1b is pulled in a direction orthogonal to the second axis, is redirected to a direction orthogonal to the first axis by a first idler pulley P11b having the first axis as the rotation axis, and the layout is adjusted such that the first return cable C1b is inserted into the shaft 102 by a first adjacent idler pulley P12b adjacent to the first idler pulley P11b and having a rotation axis parallel to the first axis. Then, the first return cable C1b is inserted into the shaft 102, and then wound around the first motor capstan MC1 via an idler pulley P13b from the opposite direction of the first outward cable C1a as illustrated in FIG. 4.

In short, the first reciprocating cable set C1a and C1b are laid out so as to transmit power between the first jaw capstan JC1 and the first motor capstan MC1 by the cable loop method. Therefore, as can be seen from FIG. 6, by rotating the first motor capstan MC1 with the first motor M1, the first jaw capstan JC1 can be rotated to adjust the turning angle of the first jaw member J1 about the second axis.

Additionally, as illustrated in FIGS. 3 and 5, the second outward cable C2a is pulled in a direction orthogonal to the second axis, is redirected to a direction orthogonal to the first axis by a second idler pulley P21a having the first axis as the rotation axis, and the layout is adjusted such that the second outward cable C2a is inserted into the shaft 102 by a second adjacent idler pulley P22a adjacent to the second idler pulley P21a and having a rotation axis parallel to the first axis. Then, the second outward cable C2a is inserted into the shaft 102, and then wound around the second motor capstan MC2 via an idler pulley P23a.

On the other hand, the second return cable C2b is pulled in a direction orthogonal to the second axis, is redirected in a direction orthogonal to the first axis by a second idler pulley P21b having the first axis as the rotation axis, and the layout is adjusted such that the second return cable C2b is inserted into the shaft 102 by a second adjacent idler pulley P22b adjacent to the second idler pulley P21b and having a rotation axis parallel to the first axis. Then, the first return cable C1b is inserted through the shaft 102, and then wound around the second motor capstan MC2 via an idler pulley P23b from the opposite direction of the second outward cable C2a.

In short, the second reciprocating cable set C2a and C2b are laid out so as to transmit power between the second jaw capstan JC2 and the second motor capstan MC2 by the cable loop method. Therefore, as can be seen from FIG. 6, by rotating the second motor capstan MC2 with the second motor M2, the second jaw capstan JC2 can be rotated to adjust the turning angle of the second jaw member J2 about the second axis.

By controlling the traction of the first reciprocating cable set C1a and C1b and the second reciprocating cable set C2a and C2b by the first motor M1 and the second motor M2 so that the difference in angle about the second axis between the first jaw member J1 and the second jaw member J2 changes, the end effector including the pair of jaw members J1 and J2 can be opened and closed. The opening/closing angle is determined by a difference in angle about the second axis between the first jaw member J1 and the second jaw member J2.

Additionally, by controlling the traction of the first reciprocating cable set C1a and C1b and the second reciprocating cable set C2a and C2b by the first motor M1 and the second motor M2 so that the sum of the angles of the first jaw member J1 and the second jaw member J2 about the second axis changes, the end effector can be turned about the second axis. The average value of angles of the first jaw member J1 and the second jaw member J2 about the second axis is the turning angle of the end effector about the second axis.

On the other hand, the first motor M1 is fixed to the first slide base SB1 together with the first motor capstan MC1 and the idler pulleys P13a and P13b. Additionally, the second motor M2 is fixed to the first slide base SB1 together with the second motor capstan MC2 and the idler pulleys P23a and P23b. Then, the third outward cable C3a is coupled to the first slide base SB1 via the idler pool P3a. Additionally, the third return cable C3b is coupled to the second slide base SB2 via the third idler pulley P3b.

Note that the third outward cable C3a in the section from the first slide base SB1 to the third idler pulley P3a and the third return cable C3b in the section from the second slide base SB2 to the third idler pulley P3b are desirably laid out so as to be parallel to the longitudinal axis of the shaft 102.

In short, the third reciprocating cable set C3a and C3b are laid out so as to transmit power between the third motor capstan MC3 and the first slide base SB1 and second slide base SB2. Therefore, by rotating the third motor capstan MC3 by the third motor M3, the first slide base SB1 and the second slide base SB2 can be moved forward and backward in opposite directions in the longitudinal axis direction of the shaft 102.

Referring to FIGS. 5 and 6, the second reciprocating cable set C2a and C2b are wound around the second idler pulleys P21a and P21b from a direction opposite to the direction in which the first reciprocating cable set C1a and C1a are wound around the first idler pulleys P11a and P11b. Therefore, a rotational force is applied to the wrist element WE in opposite directions about the first axis when the first reciprocating cable set C1a and C1a are retracted and when the second reciprocating cable set C2a and C2a are retracted. Therefore, when the first slide base SB1 is advanced to the tip end (i.e., distal end) of the shaft 102 and the second slide base SB2 is retracted to the root side (i.e., proximal end) of the shaft 102, the first reciprocating cable set C1a and C1a are advanced and the second reciprocating cable set C2a and C2b are retracted. As a result, the wrist element WE rotates in the positive direction about the first axis. Conversely, when the first slide base SB1 is retracted and the second slide base SB2 is advanced, the first reciprocating cable set C1a and C1a are retracted and the second reciprocating cable set C2a and C2b are advanced. As a result, the wrist element WE rotates in the negative direction about the first axis. Here, assume that both the first reciprocating cable set C1a and C1b and the second reciprocating cable set C2a and C2b have a constant total length.

By pulling the third reciprocating cable set C3a and C3b with the third motor M3 and moving the first reciprocating cable set C1a and C1b and the second reciprocating cable set C2a and C2b forward and backward according to the sliding of the first slide base SB1 and the second slide base SB2, it is possible to turn the wrist element WE about the first axis. Additionally, when the wrist element WE is turned about the first axis, the pre-tension of the first reciprocating cable set C1a and C1b and the second reciprocating cable set C2a and C2b does not change.

Motions of the surgical instrument unit tip end part 101 will be summarized.

Motion at First Axis:

When the third motor capstan MC3 is rotated by the third motor M3, traction is generated in any one of the third reciprocating cable set C3a and C3b. As a result, the wrist element WE and the end effector mounted on the wrist element WE can be turned in the forward direction or the reverse direction about the first axis.

Motion at Second Axis:

The average value of the angle of the first jaw member J1 about the second axis and the angle of the second jaw member J2 about the second axis is defined as the angle of the end effector about the second axis. By rotating the first jaw capstan JC1 and the second jaw capstan JC2 in the same direction at the same speed, the end effector is turned about the second axis.

Motion of End Effector:

The end effector includes a pair of jaw members of the first jaw member J1 and the second jaw member J2 facing each other (see FIG. 3, for example). The opening angle between the first jaw member J1 and the second jaw member J2 is set as an opening/closing angle of the end effector. By rotating the first motor capstan MC1 and the second motor capstan MC2 in opposite directions at the same speed, the end effector is opened and closed.

Note that, for details of the surgical instrument unit 100, refer to Japanese Patent Application No. 2019-166763 (PCT/JP2020/031905) already assigned to the present applicant.

Additionally, terms will be described. In the surgical instrument unit 100 described above, two types of pulleys, "idler pulley" and "capstan", are used. An idler pulley is a "free pulley", and is used for cable layout adjustment and application of tension to a cable. A capstan is used for applying power or conversely converting a force from a cable into an axial force.

Additionally, in the following description, unless otherwise specified, the surgical instrument unit includes a shaft, an end effector such as forceps attached to the tip end of the shaft, and a base that supports the shaft, and is replaceable by removing the shaft from the base. A cable that applies traction to the end effector such as forceps or tweezers is inserted into the shaft, and a motor that pulls the cable is disposed in the base. The above-described slide base corresponds to a base. A cable may be referred to as a "wire", but is unified as a "cable" in the present specification.

C. Arrangement of External Force Detection System

In order to feed back information such as an external force applied to the surgical instrument unit to the master device, a detection system that detects the external force applied to the tip end of the surgical instrument unit is required. Additionally, the external force detection system desirably has three degrees of freedom (DoF) capable of detecting at least three directions including an external force acting in the Z direction that is the longitudinal direction (or shaft direction) of the surgical instrument unit, and external forces acting in the X and Y directions orthogonal to the Z direction.

A configuration method of an external force detection system that detects an external force applied to a surgical instrument unit will be considered. The above section B describes the surgical instrument unit 100 having a total of three degrees of freedom, that is, the first axis that turns the wrist about the yaw axis, for example, with respect to the tip end of the shaft, the second axis that turns the direction of the end effector about the pitch axis, for example, with respect to the wrist, and the third axis (opening/closing axis) that opens and closes the jaw member. The surgical instrument unit 100 described in section B uses three reciprocating cables and three motors.

Figure 7:
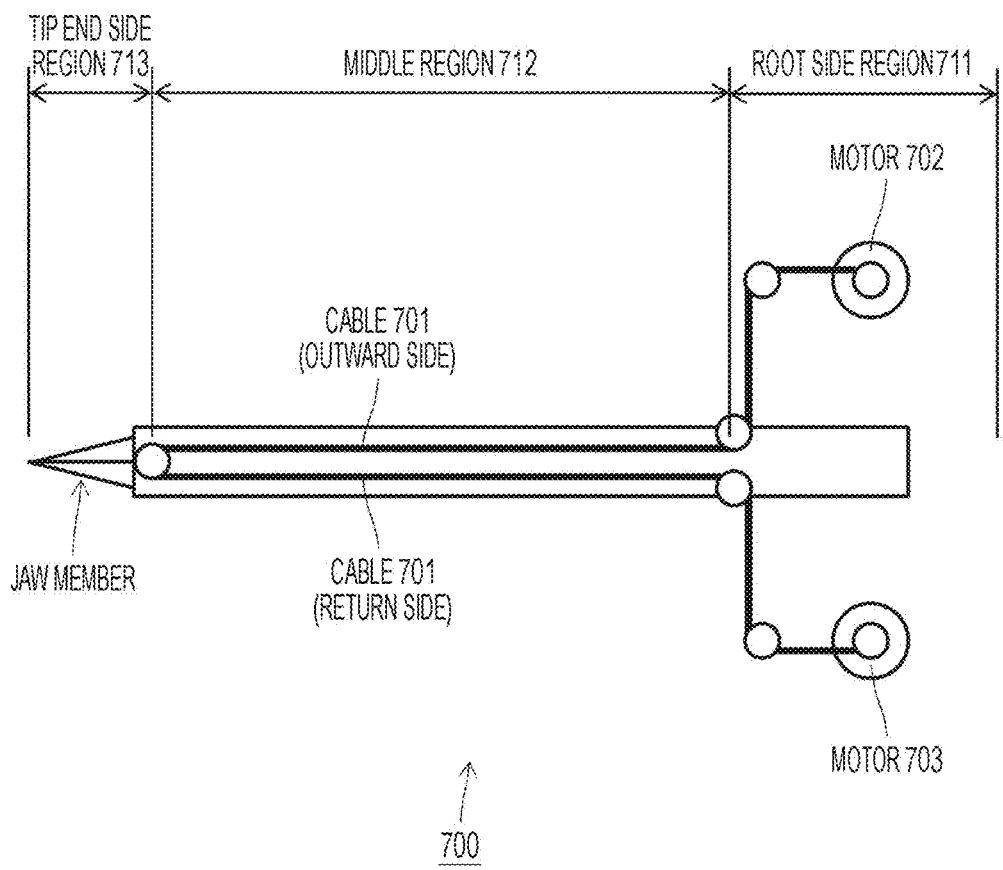
FIG. 7 is a diagram illustrating an arrangement of an external force detection system in a surgical instrument unit 700.

Here, for simplification, as illustrated in FIG. 7, a surgical instrument unit 700 including one cable 701 for opening and closing a jaw member at the tip end and two motors 702 and 703 for pulling the outward side and the return side of the cable 701 will be described as an example.

A force sensor is used to detect external force. In general, a force sensor includes a strain generating body that is easily distorted by an external force and a strain sensor that is attached to the strain generating body and outputs a signal corresponding to a strain amount of the strain generating body, and performs signal processing on the output signal of the strain sensor to convert the strain amount of the strain generating body into an external force. In the surgical instrument unit 700 illustrated in FIG. 7, the place where such a force sensor is installed is roughly divided into three regions of a region 711 on the root side (or proximal end side) of a section pulled by the cable 701, a middle region 712 through which the cable 701 is inserted, and a region 713 on the tip end side (or distal end side) of the cable.

When the force sensor is installed in the middle region 713, not only the external force but also traction (or torque of motors 702 and 703) of the cable 701 acts thereon. Therefore, there is a concern that the external force cannot be measured accurately due to interference with the traction of the cable 701. On the other hand, the traction of the cable 701 does not act on any of the region 711 on the root side or the region 713 on the tip end side. Therefore, if the force sensor is arranged in either the region 711 on the root side or the region 713 on the tip end side, the external force can be measured without interference of the traction of the cable 701.

However, in a case where the force sensor is installed in the region 711 on the root side, the inertial force due to the weight of the surgical instrument unit 700 acts on the force sensor, and thus, it is difficult to measure the external force accurately.

Additionally, in a case where the force sensor is installed in the region 713 on the tip end side, the external force can be measured accurately without interference due to the traction of the cable 701 or the inertial force. However, the surgical instrument unit 700 needs to be sterilized every time it is used for surgery, and the force sensor may deteriorate in the process of the sterilization treatment. Additionally, if the force sensor is installed in the tip end part to complicate the structure, there is a possibility that contaminants may remain even after cleaning. Additionally, when the force sensor is installed, it is difficult to downsize the tip end part.

Therefore, in the present disclosure, it is proposed to arrange a force sensor capable of removing interference due to traction of wire in the middle region 712 of the surgical instrument unit 700. The force sensor according to the present disclosure is arranged on the distal end side of the region 711 on the root side, and therefore can reduce the influence of inertial force due to the weight of the surgical instrument unit 700. Additionally, the force sensor according to the present disclosure is not arranged at the tip end of the surgical instrument unit 700. Hence, it is possible to solve the problems of deterioration due to sterilization, remaining of contamination, and downsizing of the tip end part.

D. Specific Configuration Example of External Force Detection System

Figure 8:
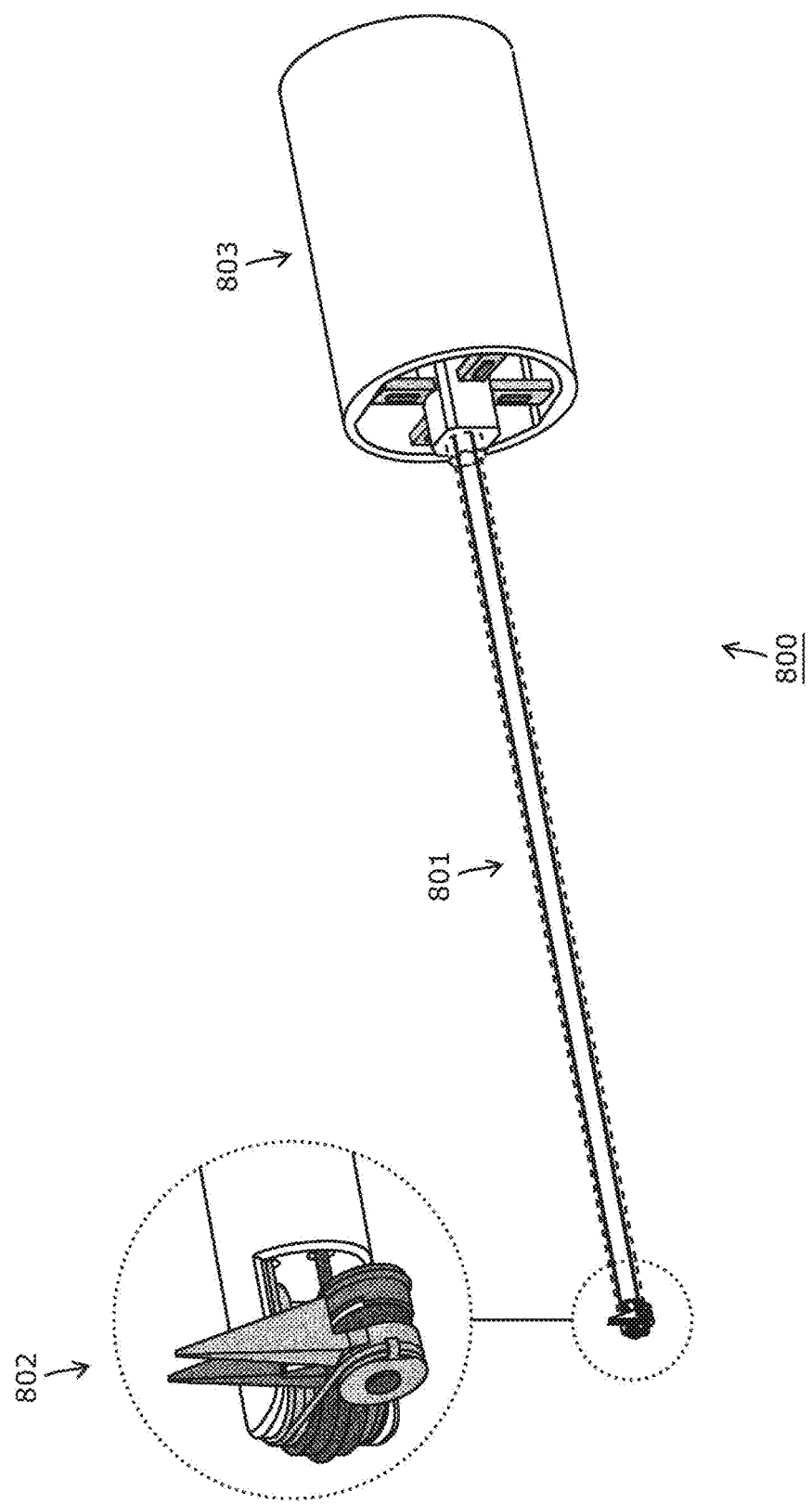
FIG. 8 is a diagram illustrating a specific configuration example of a surgical instrument unit 800.

FIG. 8 illustrates a specific configuration example of a surgical instrument unit 800 in which an external force detection system is incorporated in the "middle region" described above.

The surgical instrument unit 800 includes a shaft 801, an end effector 802 such as forceps attached to the tip end of the shaft 801, and a base 803 that supports the shaft 801. A cable (not illustrated in FIG. 8) for applying traction to the end effector 802 such as forceps is inserted into the shaft 801, and a motor (not illustrated in FIG. 8) for pulling the cable is disposed in the base 803. Since the specific configuration of the end effector 802, the cable driving system, and the arrangement of the motor have already been described in the above section B, the description thereof will be omitted here.

D-1. Structure of Strain Generating Body

Figure 9:
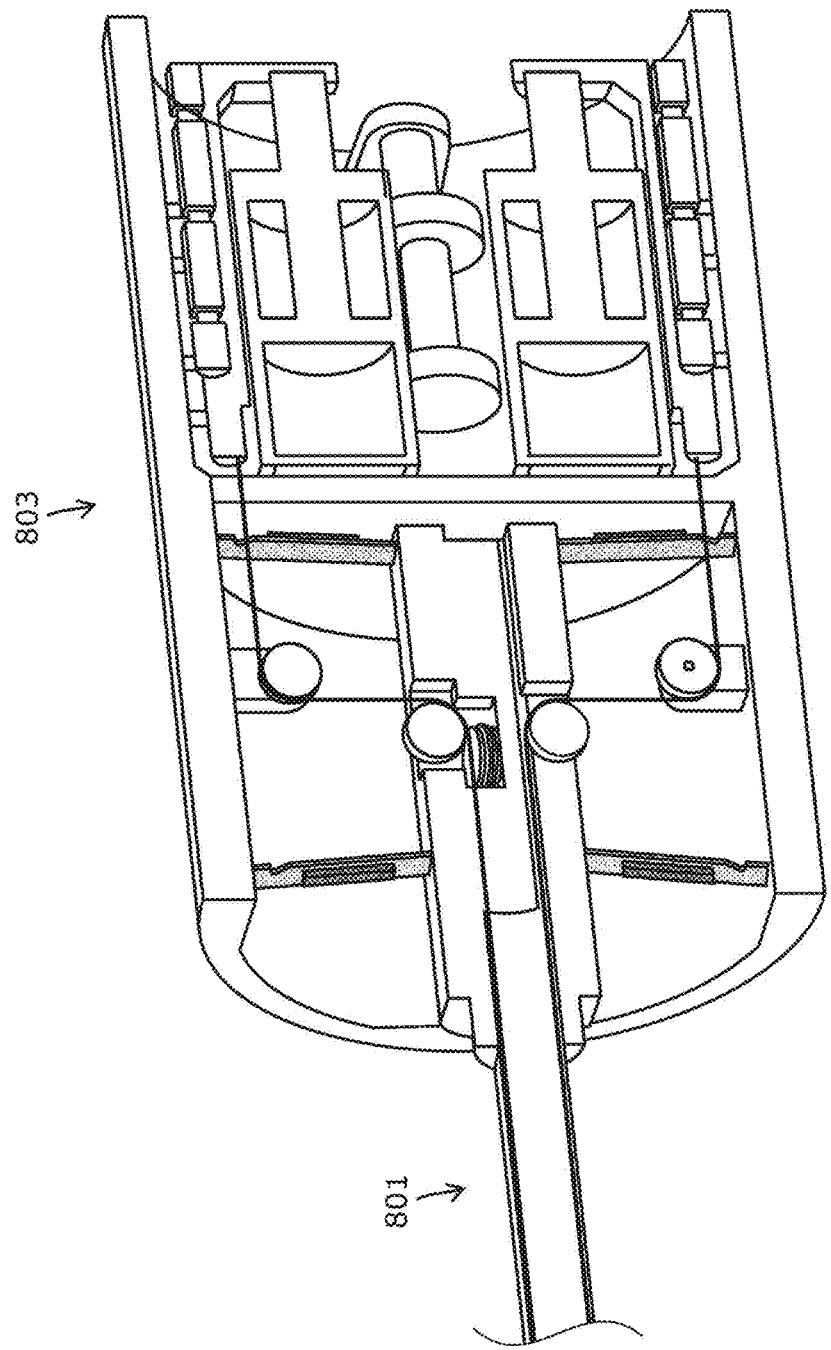
FIG. 9 is a cross-sectional perspective view of a root part of a shaft 801 and a connecting part of a base 803.
Figure 10:
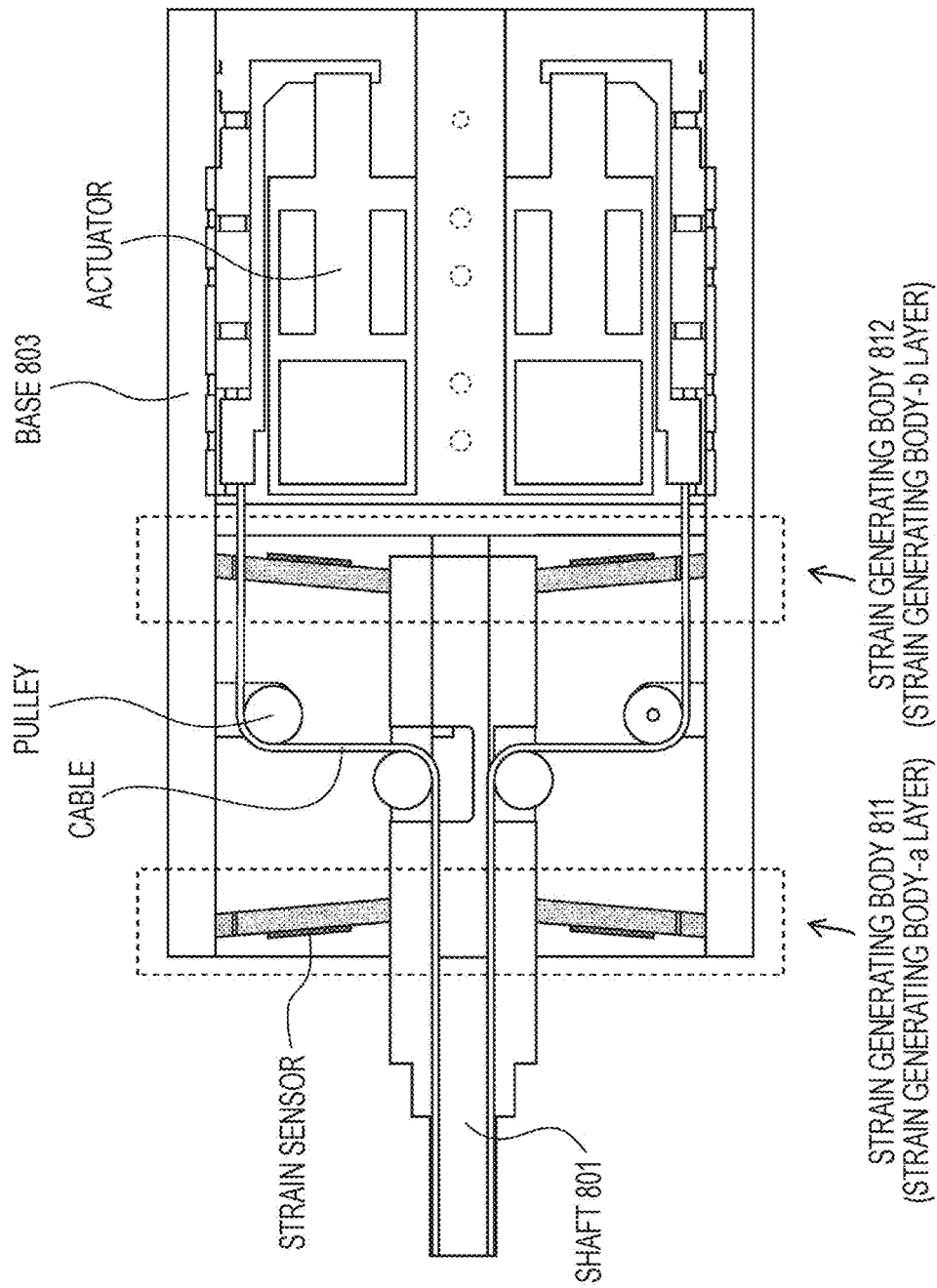
FIG. 10 is a diagram illustrating a cross section of the root part of the shaft 801 and the connecting part of the base 803.

The shaft 801 is supported by the base 803 at a root part. FIG. 9 is a cross-sectional perspective view of the root part of the shaft 801 and a connecting part of the base 803. FIG. 10 illustrates a cross section of the root part of the shaft 801 and the connecting part of the base 803. Assume that the shaft 801 can be removed from the base 803 and replaced. In general, every time the shaft 801 is replaced, the end effector 802 part is cleaned and sterilized.

In the present disclosure, as shown in FIGS. 8 to 10, the root part of the shaft 801 is supported by two layers of strain generating bodies 811 and 812. Hereinafter, the strain generating body 811 on the tip end side is also referred to as "a layer" strain generating body, and the strain generating body 812 on the root side is also referred to as "b layer" strain generating body.

Figure 11:
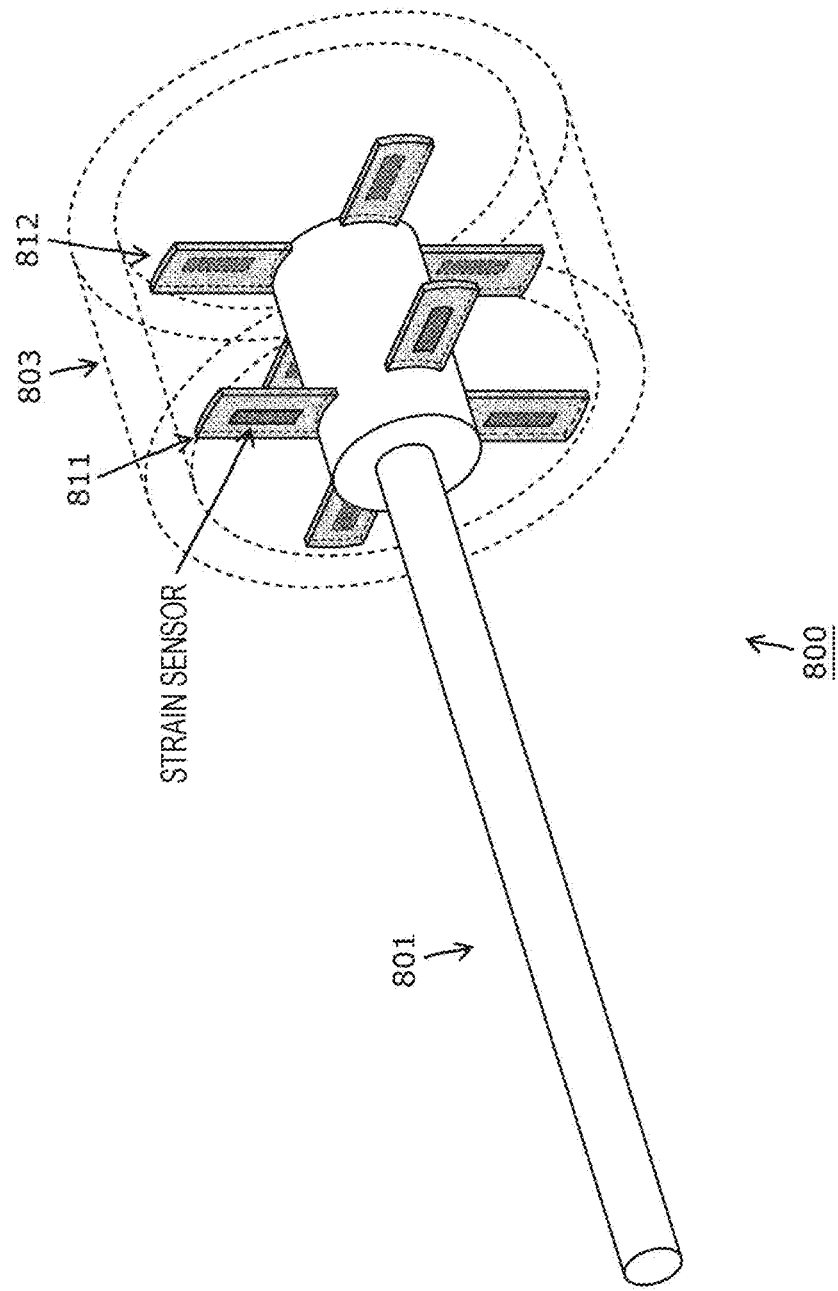
FIG. 11 is a diagram illustrating a structure of a four-direction strain generating body.

In FIG. 11, the base 803 is drawn transparently, to visualize the strain generating bodies 811 and 812. Each of the strain generating body-a layer 811 and the strain generating body-b layer 812 is a "four-direction strain generating body" that supports the root part of the shaft 801 in four directions by four legs extending from the root of the shaft 801 to the outer base 803. In the example illustrated in FIG. 11, the legs of the four-direction strain generating body have the same shape and the same dimension, are arranged at equal intervals (intervals of 90 degrees about long axis of shaft 801), and support the shaft 801 at substantially the center of the hollow cylindrical base 803. Additionally, assume that rotational positions of the strain generating body-a layer 811 and the strain generating body-b layer 812 about the long axis of the shaft 801 substantially coincide with each other. Then, a strain sensor is attached to each leg of the strain generating body-a layer 811 and the strain generating body-b layer 812, and measures a strain amount of each leg when an external force is applied to the end effector 802 at the tip end of the shaft 801. In FIG. 11, the strain generating body-a layer 811 and the strain generating body-b layer 812 are painted in light gray. Additionally, the strain sensors attached to the legs of the strain generating body-a layer 811 and the strain generating body-b layer 812 are painted in dark gray.

A strain generating body is manufactured using, for example, stainless steel (steel use stainless: SUS), a Co—Cr alloy, or a titanium-based material known as a metal-based material having excellent biocompatibility. From the viewpoint of application to a medical instrument such as the surgical instrument unit 800, it is preferable to manufacture the strain generating body using a material having mechanical characteristics such as high strength and low rigidity (low Young's modulus), such as a titanium alloy.

Additionally, in the present embodiment, it is assumed that a fiber Bragg grating (FBG) sensor manufactured using an optical fiber is used as the strain sensor. Here, an FBG sensor is a sensor formed by engraving a diffraction grating (grating) along the long axis of an optical fiber, and can detect a change in an interval between diffraction gratings due to strain generated by an acting force or expansion or contraction accompanying a change in temperature as a change in a wavelength of reflected light with respect to incident light in a predetermined wavelength band (Bragg wavelength) (well known). Then, the change in wavelength detected by the FBG sensor can be converted into a strain, stress, or temperature change as the cause. It is also conceivable to utilize, as the strain sensor, other types of strain detection elements widely known in the art, such as a capacitive sensor, a semiconductor strain gauge, a foil strain gauge, and the like, as a matter of course. Note, however, that an FBG sensor is considered to be more preferable taking into account the advantages such as small transmission loss, sterilization handling required for medical care, and handling in a strong magnetic field environment.

Figure 12:
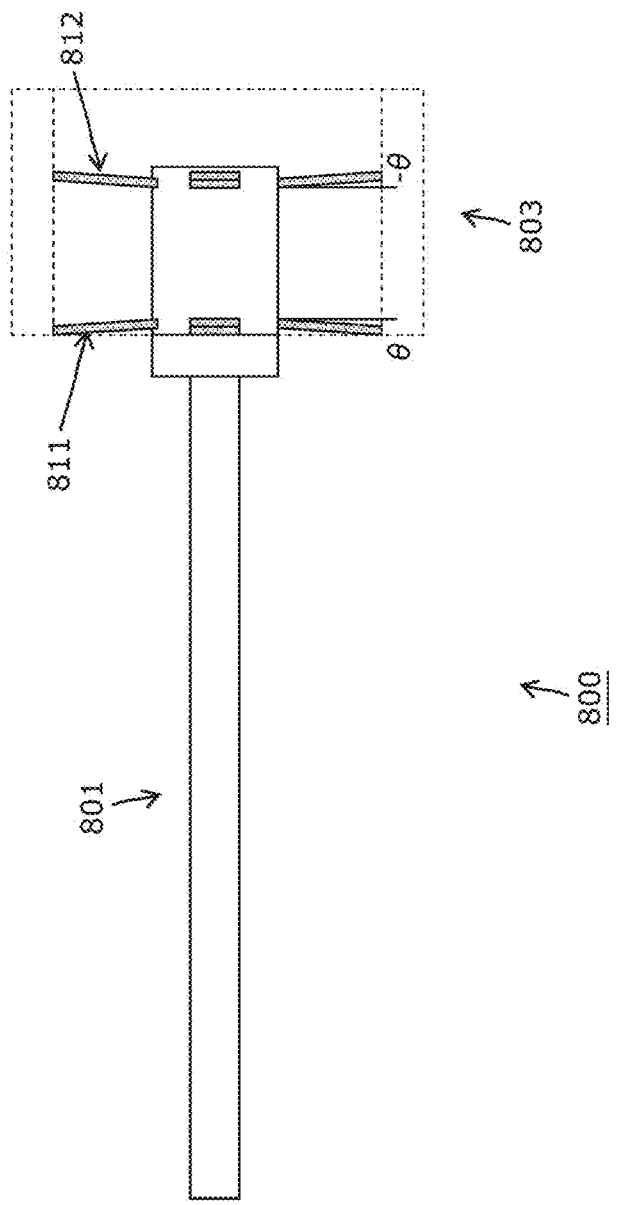
FIG. 12 is a cross-sectional view illustrating a structure of a four-direction strain generating body.

FIG. 12 illustrates a side view (or YZ cross section) of a set of the strain generating body-a layer 811 and the strain generating body-b layer 812 included in the four-direction strain generating body as viewed from a direction orthogonal to the long axis (or Z axis) of the shaft 801. Each leg in the four directions of the strain generating body-a layer 811 is inclined by a predetermined angle with respect to a plane (or Y axis) orthogonal to the Z axis. Hereinafter, this inclination angle is denoted by $\theta$. Additionally, each leg in the four directions of the strain generating body-b layer 812 is inclined by an angle $-\theta$ with respect to the plane (or Y axis) orthogonal to the Z axis, contrary to the strain generating body-a layer 811. Therefore, the cross sections of the strain generating body-a layer 811 and the strain generating body-b layer 812 form a "chevron" shape as can be seen from FIG. 12. For example, $\theta$ is about three degrees.

Figure 13:
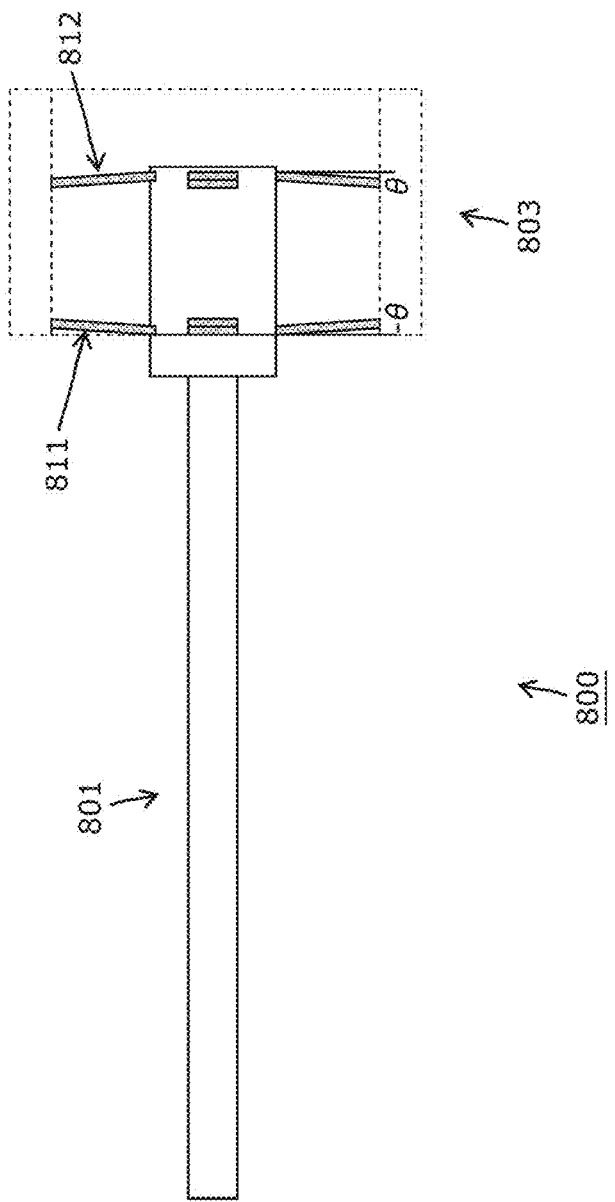
FIG. 13 is a cross-sectional view (modification of FIG. 12) illustrating a structure of a four-direction strain generating body.

Additionally, FIG. 13 shows a modification including a set of strain generating bodies 811 and 812 included in a four-direction strain generating body. In the example illustrated in FIG. 13, each leg in the four directions of the strain generating body-a layer 811 is inclined by an angle $-\theta$ with respect to a plane (or Y axis) orthogonal to the Z axis. Additionally, each leg in the four directions of the strain generating body-b layer 812 is inclined at an angle $\theta$ with respect to the plane orthogonal to the Z axis (or Y axis), contrary to the strain generating body-a layer 811. Therefore, the cross sections of the strain generating body-a layer 811 and the strain generating body-b layer 812 form an inverted "chevron" shape as can be seen from FIG. 13.

Figure 14:
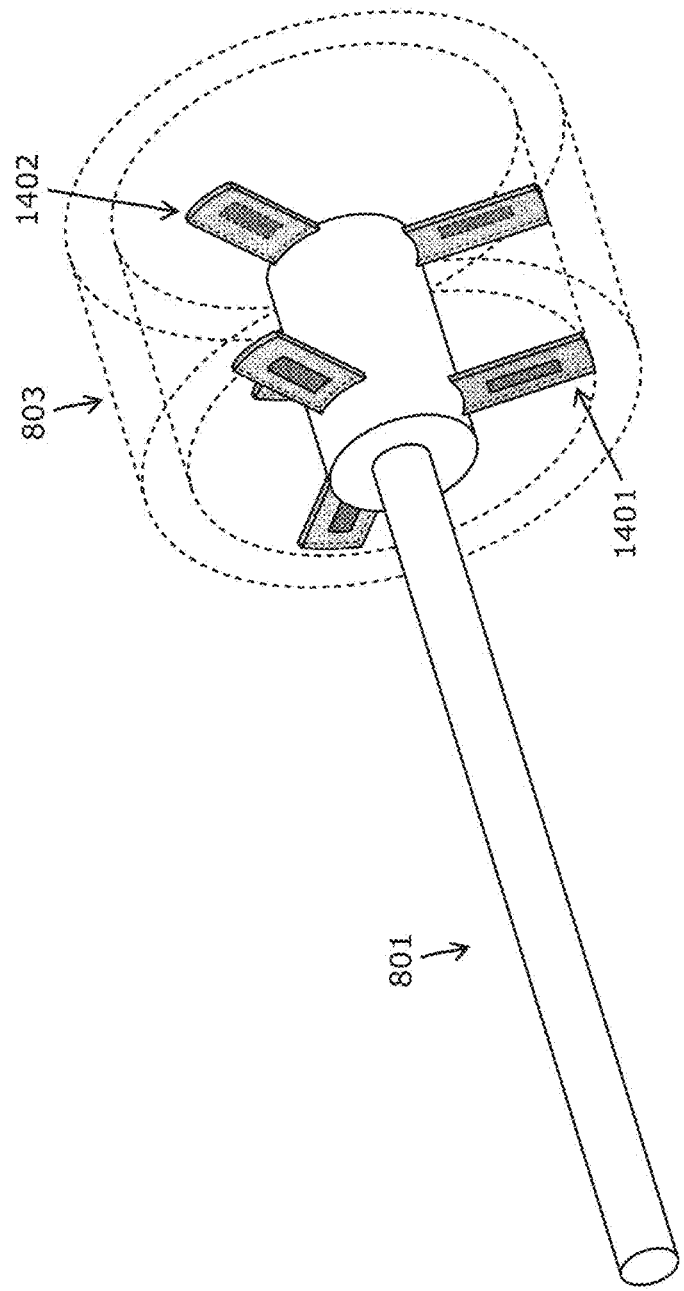
FIG. 14 is a diagram illustrating a structure of a three-direction strain generating body.
Figure 15:
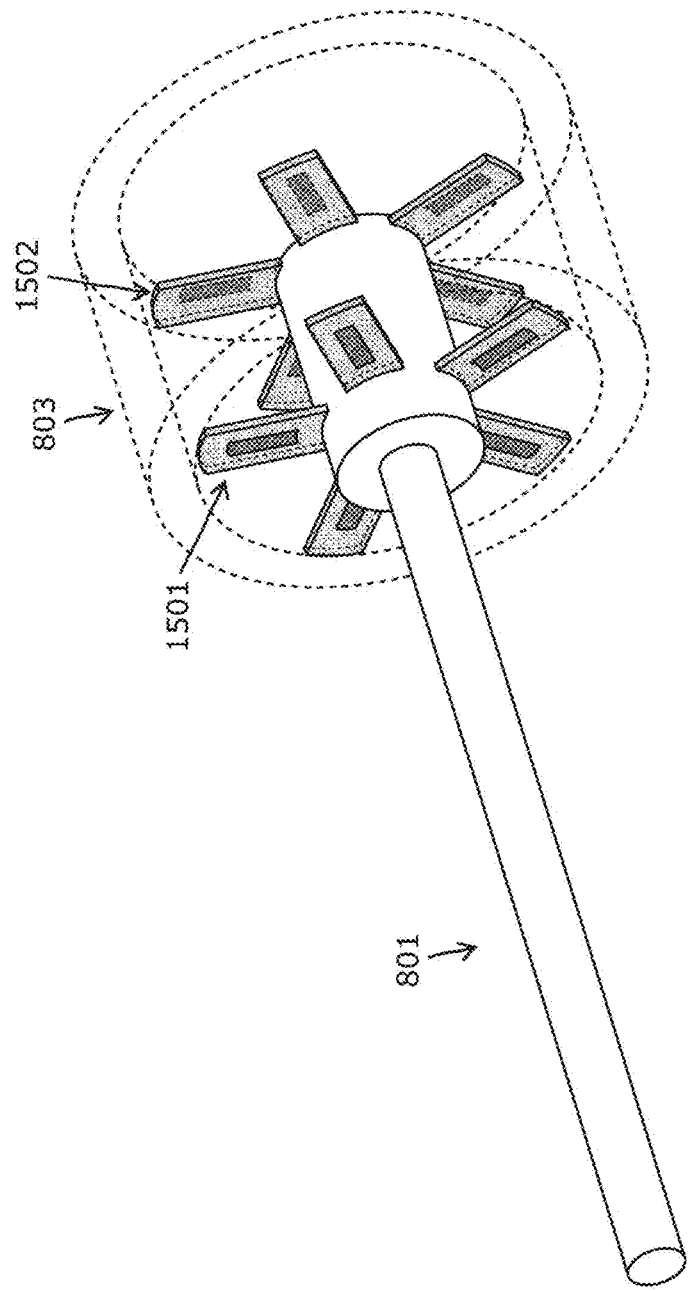
FIG. 15 is a diagram illustrating a structure of a five-direction strain generating body.

Note that the structures of the strain generating body-a layer 811 and the strain generating body-b layer 812 are not limited to the "four-direction strain generating body" as illustrated in FIG. 11, in which the root part of the shaft 801 is supported with respect to the base 803 with the legs in four directions. As illustrated in FIG. 14, a base part of a shaft 801 may be "three-direction strain generating bodies" 1401 and 1402 which support the root part with respect to a base 803 by legs in three directions, or as illustrated in FIG. 15, a base part of a shaft 801 may be "five-direction strain generating bodies" which support the root part with respect to a base 803 by legs in five directions. Additionally, although not illustrated, a multidirectional strain generating body supporting the root part by legs in six or more directions may be used. Note, however, that in the case of a "bidirectional strain generating body" in which a root part of a shaft 801 is supported by legs in two directions, an external force acting on the tip end of the shaft 801 cannot be separated into components in each of XYZ directions.

D-2. Strain Mode of Strain Generating Body Set by External Force

Next, strain modes of the strain generating body when an external force acts on the shaft 801 will be described. Here, for the sake of convenience, the strain modes will be described taking the "four-direction strain generating body" illustrated in FIGS. 11 and 12 that supports the root part of the shaft 801 with respect to the base 803 in four directions as an example.

The four legs of the strain generating body-a layer 811 and the strain generating body-b layer 812 have the same shape and the same dimension, are arranged at equal intervals (intervals of 90 degrees about long axis of shaft 801), and support the shaft 801 at substantially the center of the hollow cylindrical base 803. Additionally, assume that rotational positions of the strain generating body-a layer 811 and the strain generating body-b layer 812 about the long axis of the shaft 801 substantially coincide with each other. Then, a strain sensor is attached to each leg of the strain generating body-a layer 811 and the strain generating body-b layer 812, and measures a strain amount of each leg when an external force is applied to the end effector 802 at the tip end of the shaft 801.

Figure 16:
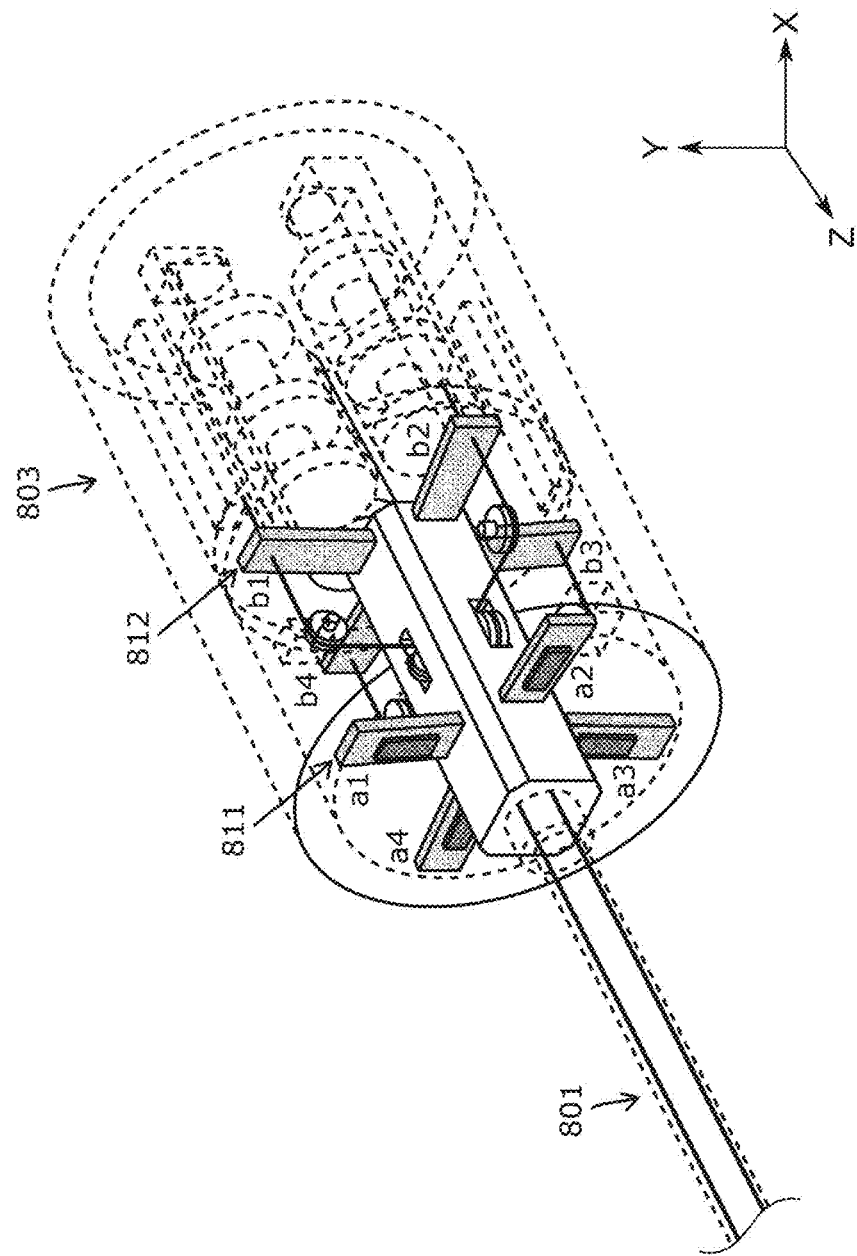
FIG. 16 is a diagram illustrating a structure of a four-direction strain generating body.

Here, as illustrated in FIG. 16, four legs of the strain generating body-a layer 812 are denoted by a1 to a4, respectively, and four legs of the strain generating body-b layer 812 are denoted by b1 to b4, respectively. Additionally, the strain amounts of the legs a1 to a4 of the strain generating body-a layer 811 are denoted by $\varepsilon_{a1}$ to $\varepsilon_{a4}$, respectively, and the strain amounts of the legs b1 to b4 of the strain generating body-b layer 812 are denoted by $\varepsilon_{b1}$ to $\varepsilon_{b4}$, respectively, the strain amounts detected by the strain sensors arranged in the legs a1 to a4 and b1 to b4. Additionally, FIG. 16 also illustrates XYZ coordinates. The Z axis coincides with the long axis of the shaft 801. The X axis and the Y axis are axes orthogonal to the Z axis, and the X axis and the Y axis are also orthogonal to each other. Although not illustrated, assume that the external force detection system according to the present disclosure includes a signal processing device that processes a detection signal of a strain sensor arranged in each of the legs a1 to a4 and b1 to b4. The signal processing device calculates the strain amounts $\varepsilon_{a1}$ to $\varepsilon_{a4}$ and $\varepsilon_{b1}$ to $\varepsilon_{b4}$ of the legs a1 to a4 and b1 to b4, further determines the strain mode of the surgical instrument unit 800 on the basis of the strain amounts $\varepsilon_{a1}$ to $\varepsilon_{a4}$ and $\varepsilon_{b1}$ to $\varepsilon_{b4}$, and converts external forces $F_X$, $F_Y$, and $F_Z$ in the XYZ directions acting on the surgical instrument unit 800. Details of the determination of the strain mode and the calculation method of the external force will be described later.

The strain modes of the strain generating body-a layer 811 and the strain generating body-b layer 812 include a "cable traction mode" in which strain is generated when traction acts on the cable, an "$F_Z$ mode" in which an external force in the ±Z direction acts on the tip end part of the shaft 801, an "$F_Y$ mode" in which an external force in the ±Y direction acts on the tip end part of the shaft 801, and an "$F_X$ mode" in which an external force in the ±X direction acts on the tip end part of the shaft 801.

Note that the cable referred to herein is any one of the first reciprocating cable set C1a and C1b, the second reciprocating cable set C2a and C2b, or the third reciprocating cable set C3a and C3b described in the above section B.

Figure 17:
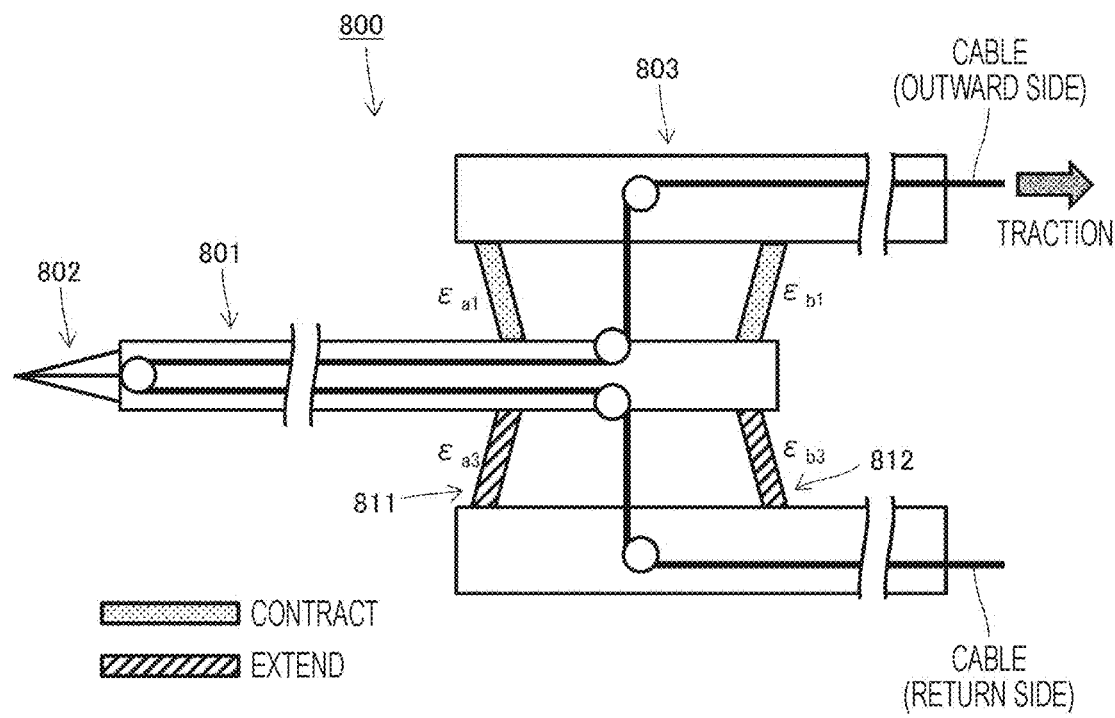
FIG. 17 is a diagram illustrating a motion example of strain generating bodies of a layer and b layer in a cable traction mode.
Figure 18:
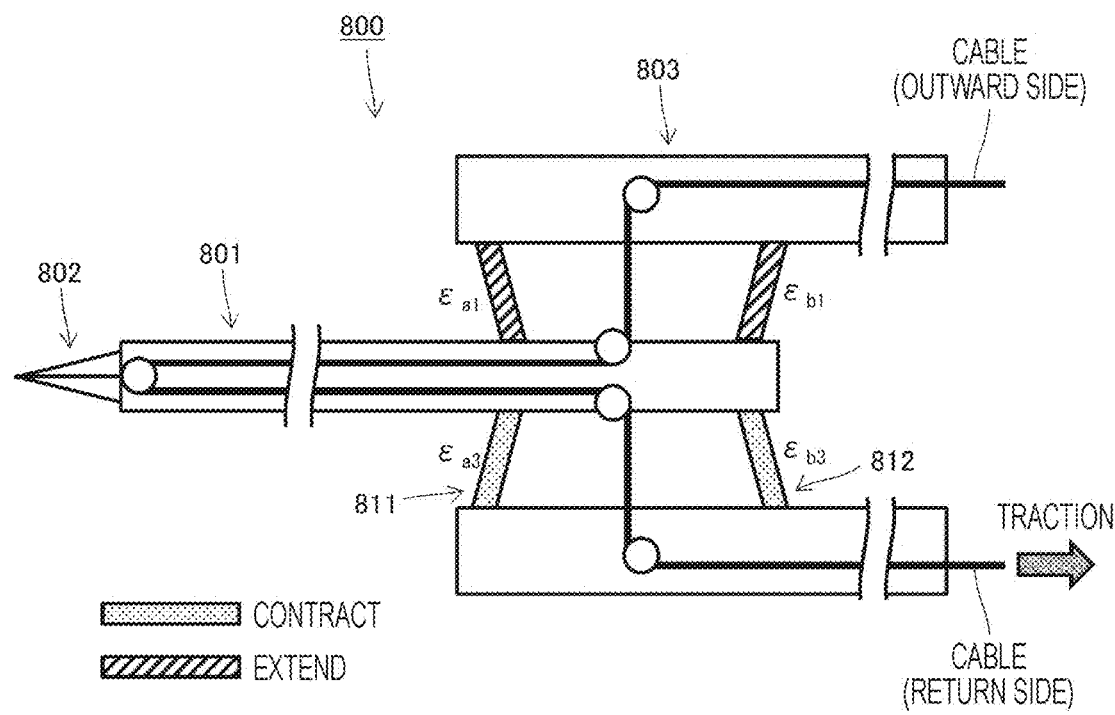
FIG. 18 is a diagram illustrating a motion example of strain generating bodies of a layer and b layer in the cable traction mode.

FIGS. 17 and 18 illustrate a motion example of the strain generating body-a layer 811 and the strain generating body-b layer 812 in the cable traction mode.

FIG. 17 illustrates a motion example when the outward side cable is pulled, and FIG. 18 illustrates a motion example when the return side cable is pulled.

Figure 19:
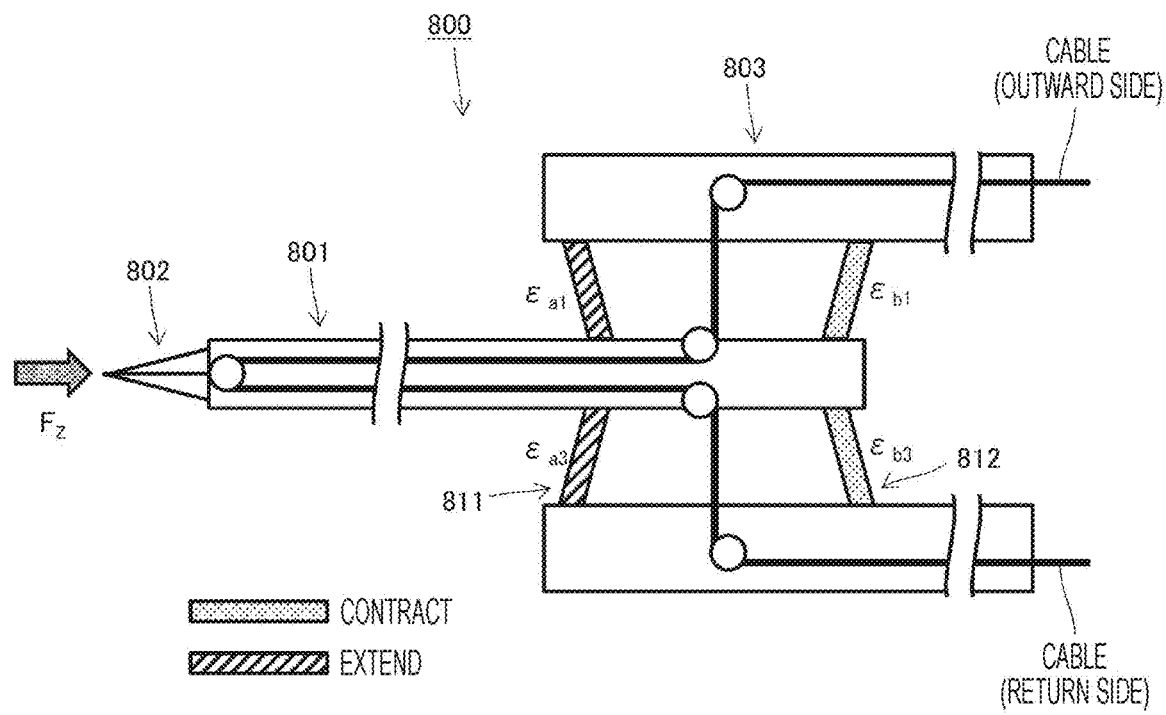
FIG. 19 is a diagram illustrating a motion example of strain generating bodies of a layer and b layer in an $F_Z$ mode.
Figure 20:
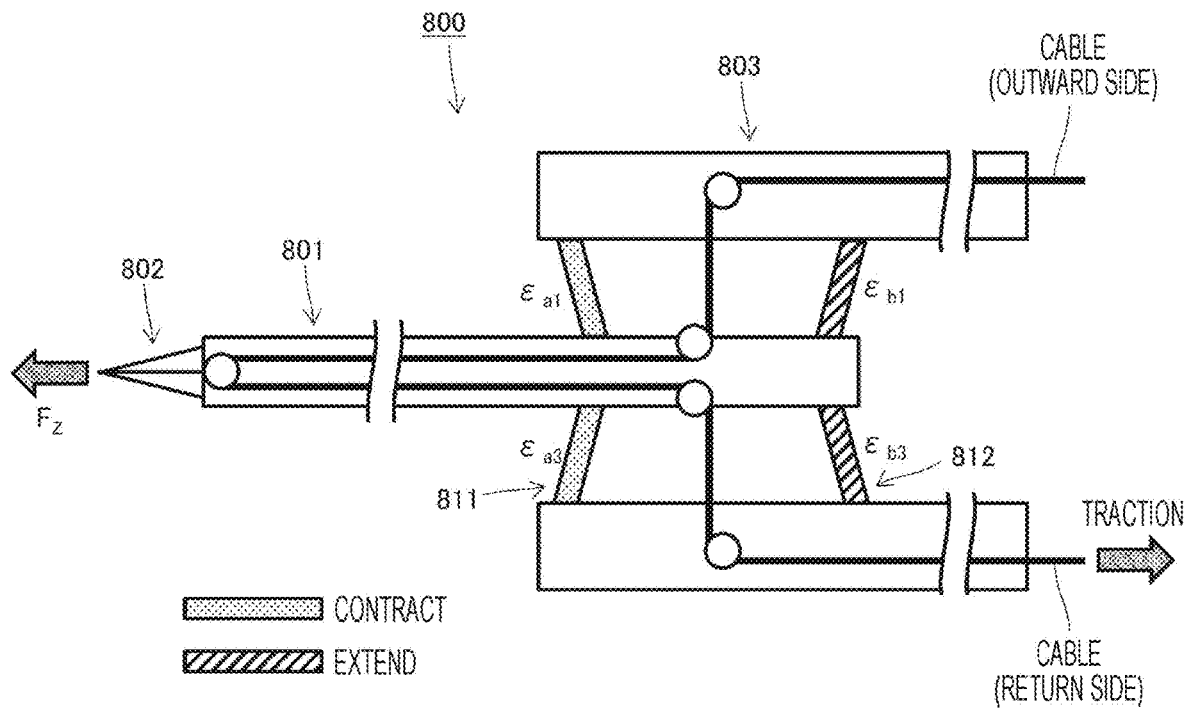
FIG. 20 is a diagram illustrating a motion example of strain generating bodies of a layer and b layer in the $F_Z$ mode.

Additionally, FIGS. 19 and 20 illustrate motion examples of the strain generating body-a layer 811 and the strain generating body-b layer 812 in the $F_Z$ mode. FIG. 19 illustrates a motion example when a compressive force (or external force in −Z direction) in the Z direction acts on the tip end of the shaft 801, and FIG. 20 illustrates a motion example when a tensile force (or external force in +Z direction) in the Z direction acts on the tip end of the shaft 801.

Figure 21:
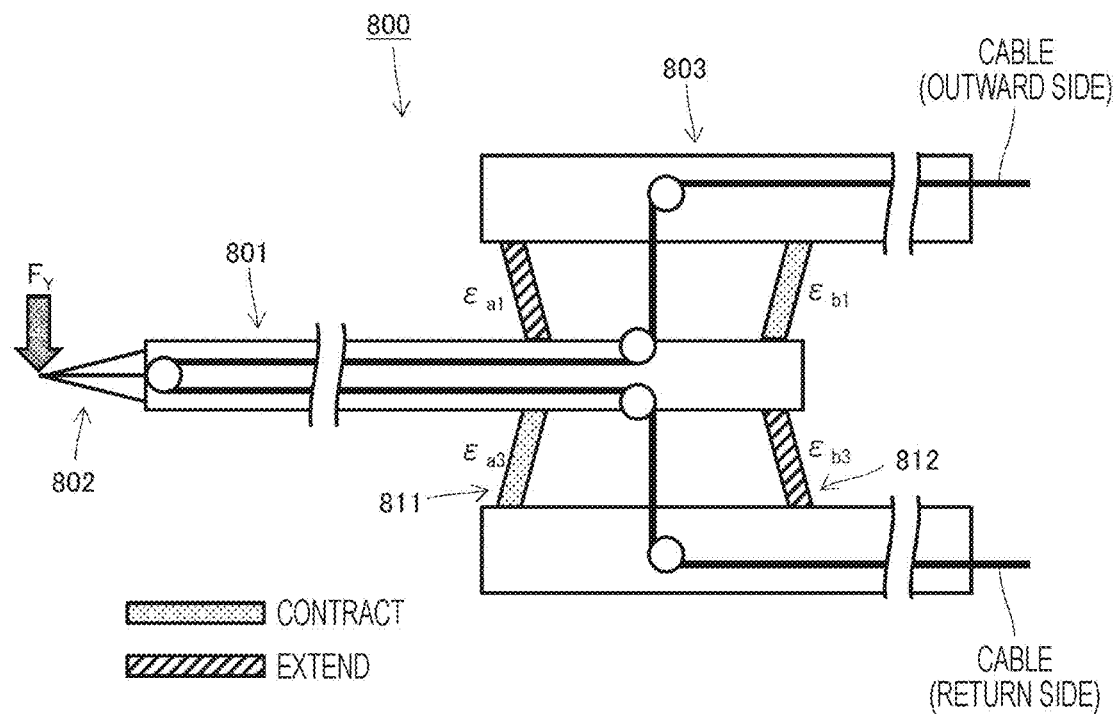
FIG. 21 is a diagram illustrating a motion example of strain generating bodies of a layer and b layer in an $F_Y$ mode.
Figure 22:
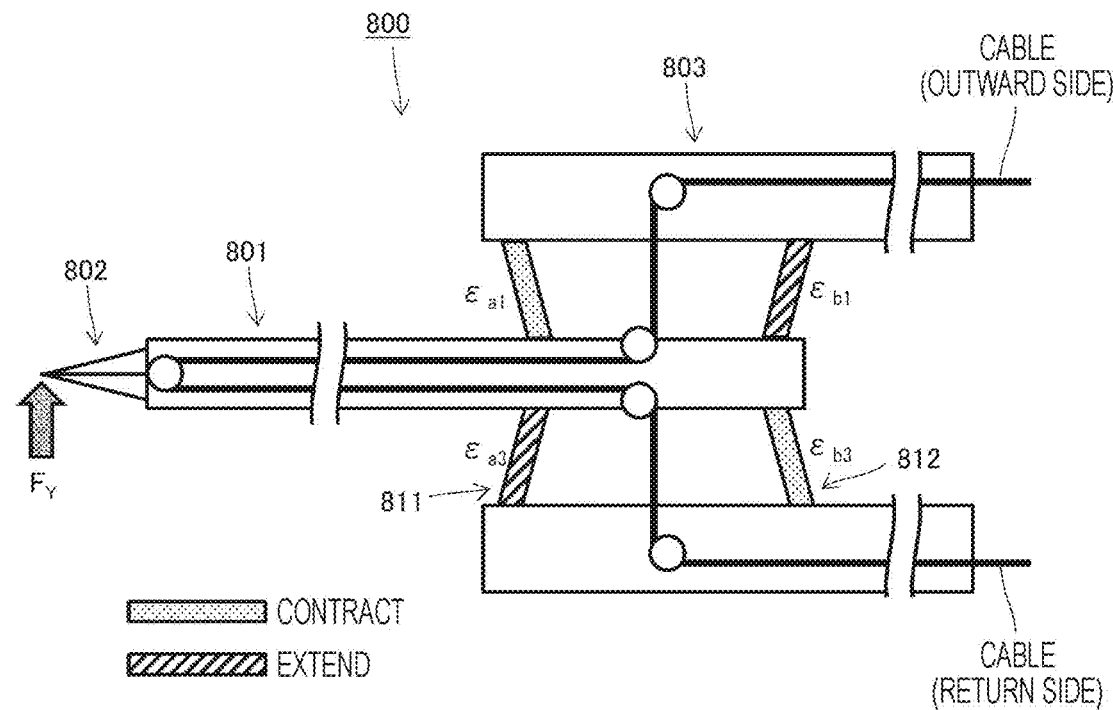
FIG. 22 is a diagram illustrating a motion example of strain generating bodies of a layer and b layer in the $F_Y$ mode.

Additionally, FIGS. 21 and 22 illustrate motion examples of the strain generating body-a layer 811 and the strain generating body-b layer 812 in the $F_Y$ mode. FIG. 21 illustrates a motion example when an external force in the −Y direction acts on the tip end of the shaft 801, and FIG. 22 illustrates a motion example when an external force in the +Y direction acts on the tip end of the shaft 801. Note that the motion of the strain generating body-a layer 811 and the strain generating body-b layer 812 in the $F_X$ mode is the same as that in a case where the motion in the $F_Y$ mode illustrated in FIGS. 21 and 22 is rotated by 90 degrees about the Z axis, and thus illustration and description thereof are omitted here.

Each of FIGS. 17 to 22 illustrates a cross section of the surgical instrument unit 800 as viewed in the X direction. Therefore, the leg a1 and the leg a3 of the strain generating body-a layer 811 and the leg b1 and the leg b3 of the strain generating body-b layer 812 are illustrated. As described above, the strain amounts of the legs a1, a3, b1, and b3 measured by the strain sensors are denoted by $\varepsilon_{a1}$ $\varepsilon_{a3}$, $\varepsilon b1$, and $\varepsilon_{b3}$ respectively.

Note that, in FIGS. 17 to 22, for the sake of simplicity, the cable is any one cable set among the first reciprocating cable set C1a and C1b, the second reciprocating cable set C2a and C2b, and the third reciprocating cable set C3a and C3b described in the above section B. It should be understood that the following description applies equally to each cable set.

The leg a1 and the leg a3 of the strain generating body-a layer 811 and the leg b1 and the leg b3 of the strain generating body-b layer 812 contract or extend depending on the strain mode of the strain generating body. In FIGS. 17 to 22, the leg that contracts and the leg that extends in each strain mode are distinguished by the difference in shading.

Referring to FIG. 17, when the outward side cable is pulled, the leg a1 of the strain generating body-a layer 811 and the leg b1 of the strain generating body-b layer 812 contract, and the leg a3 of the strain generating body-a layer 811 and the leg b3 of the strain generating body-b layer 812 extend. This is because due to traction of the outward side cable, a compressive force acts on the leg a1 of the strain generating body-a layer 811 and the leg b1 of the strain generating body-b layer 812, and conversely, a tensile force acts on the leg a3 of the strain generating body-a layer 811 and the leg b3 of the strain generating body-b layer 812.

Additionally, as illustrated in FIG. 18, when the return side cable is pulled, the leg a1 of the strain generating body-a layer 811 and the leg b1 of the strain generating body-b layer 812 extend, and the leg a3 of the strain generating body-a layer 811 and the leg b3 of the strain generating body-b layer 812 contract. This is because due to traction of the return side cable, a compressive force acts on the leg a3 of the strain generating body-a layer 811 and the leg b3 of the strain generating body-b layer 812, and conversely, a tensile force acts on the leg a1 of the strain generating body-a layer 811 and the leg b1 of the strain generating body-b layer 812.

Referring to FIG. 19, when the external force $F_Z$ in the −Z direction acts on the tip end of the shaft 801 in the $F_Z$ mode, the leg a1 and the leg a3 of the strain generating body-a layer 811 extend, whereas the leg b1 and the b3 of the strain generating body-b layer 812 contract. This is because, when the external force $F_Z$ that compresses the shaft 801 acts, a tensile force acts on the legs a1 and a3 (although not illustrated, legs a2 and a4 as well) of the strain generating body-a layer 811 on the tip end side, and conversely, a compressive force acts on the legs b1 and b3 (although not illustrated, legs b2 and b4 as well) of the strain generating body-b layer 812 on the root side. Additionally, referring to FIG. 20, when external force $F_Z$ in the +Z direction acts on the tip end of the shaft 801, the leg a1 and the leg a3 of the strain generating body-a layer 811 contract, whereas the leg b1 and the leg b3 of the strain generating body-b layer 812 extend. This is because, when the external force $F_Z$ that pulls the shaft 801 acts, a tensile force acts on the legs b1 and b3 (although not illustrated, legs b2 and b4 as well) of the strain generating body-b layer 812 on the root side, and conversely, a compressive force acts on the legs a1 and a3 (although not illustrated, legs a2 and a4 as well) of the strain generating body-a layer 811 on the tip end side.

As described above, the inclination angles of the strain generating body-a layer 811 on the tip end side and the strain generating body-b layer 812 on the root side with respect to the plane orthogonal to the Z axis are opposite to each other. For this reason, as illustrated in FIGS. 19 and 20, in response to the external force $F_Z$ in the Z-axis direction, the strain generating body-a layer 811 on the tip end side and the strain generating body-b layer 812 on the root side behave in an opposite manner in which one contracts and the other expands.

Referring to FIG. 21, when the external force $F_Y$ in the −Y direction acts on the tip end of the shaft 801 in the $F_Y$ mode, the leg a1 of the strain generating body-a layer 811 and the leg b3 of the strain generating body-b layer 812 extend, and the leg a3 of the strain generating body-a layer 811 and the leg b1 of the strain generating body-b layer 812 contract. This is because, when the external force $F_Y$ that bends the shaft 801 in the −Y direction acts, a moment in the plane of the drawing counterclockwise around the middle between the strain generating body-a layer 811 and the strain generating body-b layer 812 is generated. Additionally, referring to FIG. 22, when the external force $F_Y$ in the +Y direction acts on the tip end of the shaft 801, the leg a1 of the strain generating body-a layer 811 and the leg b3 of the strain generating body-b layer 812 contract, and the leg a3 of the strain generating body-a layer 811 and the leg b1 of the strain generating body-b layer 812 extend. This is because, when the external force $F_Y$ that bends the shaft 801 in the Y direction acts, a clockwise moment in the plane of the drawing around the middle between the strain generating body-a layer 811 and the strain generating body-b layer 812 is generated.

To summarize the above description, in the cable traction mode illustrated in FIGS. 17 and 18, the extending and contracting directions of the legs of the strain generating body-a layer 811 and the strain generating body-b layer 812 in the same position coincide with each other, whereas in the $F_Z$ mode illustrated in FIGS. 19 and 20 and the $F_Y$ mode illustrated in FIGS. 21 and 22, the extending and contracting directions of the legs of the strain generating body-a layer 811 and the strain generating body-b layer 812 in the same position are reversed. The cable traction mode is a mode in which the external force detection system is interfered by the traction of the cable, that is, the torque of the motor. Therefore, when it is detected that the extending and contracting directions of the legs of the strain generating body-a layer 811 and the strain generating body-b layer 812 in the same position coincide with each other, it is possible to eliminate interference of the traction of the cable by removing the traction of the cable from the measurement.

Additionally, in the $F_Z$ mode illustrated in FIGS. 19 and 20, the extending and contracting directions of the legs of the strain generating bodies in the same layer coincide with each other, whereas the extending and contracting directions of the legs of the strain generating bodies in different layers are reversed. On the other hand, in the $F_Y$ mode illustrated in FIGS. 21 and 22, the extending and contracting directions of the legs in positions where the legs of the same layer face each other are reversed. Therefore, the signal processing device that processes the detection signal of the strain sensor can distinguish between the $F_Z$ mode and the $F_Y$ mode according to the extending and contracting directions of the legs of the strain generating bodies in the layer and between the layers.

Note that the motion of the strain generating bodies in the $F_Z$ mode and the $F_Y$ mode is also confirmed by simulation calculation.

D-3 Force Estimation Equation

An estimation equation of the external force $F_Z$ in the $F_Z$ mode illustrated in FIGS. 19 and 20 is as in the following equation (1).

[Expression 1]

$$F_Z = K_Z \times ((\varepsilon_{b1} - \varepsilon_{a1}) + (\varepsilon_{b3} - \varepsilon_{a3})) \tag{1}$$

Additionally, an estimation equation of the external force $F_Z$ in the $F_Y$ mode illustrated in FIGS. 21 and 22 is as in the following equation (2).

[Expression 2]

$$F_Y = K_Y \times ((\varepsilon_{b1} - \varepsilon_{a1}) - (\varepsilon_{b3} - \varepsilon_{a3})) \tag{2}$$

Note, however, that the above equations (1) and (2) consider only the strain amounts of the two legs a1 and a3 of the strain generating body-a layer 811 and the two legs b1 and b3 of the strain generating body-b layer 812. Estimation equations of the external forces $F_X$, $F_Y$, and $F_Z$ in the case of the four-direction strain generating body in which the four legs of the strain generating body-a layer 811 are a1 to a4, respectively, and the four legs of the strain generating body-b layer 812 are b1 to b4, respectively, as illustrated in FIG. 16 are as shown in the following equations (3) to (5), respectively. Where $\Delta_1 = \varepsilon_{b1} - \varepsilon_{a1}$, $\Delta_2 = \varepsilon_{b2} - \varepsilon_{a2}$, $\Delta_3 = \varepsilon_{b3} - \varepsilon_{a3}$, and $\Delta_4 = \varepsilon_{b4} - \varepsilon_{a4}$.

[Expression 3]

$$F_X = K_X (\Delta_4 - \Delta_2) \tag{3}$$

[Expression 4]

$$F_Y = K_Y(\Delta_3 - \Delta_1) \quad (4)$$

[Expression 5]

$$F_Z = K_Z(\Delta_1 + \Delta_2 + \Delta_3 + \Delta_4) \quad (5)$$

Figure 23:
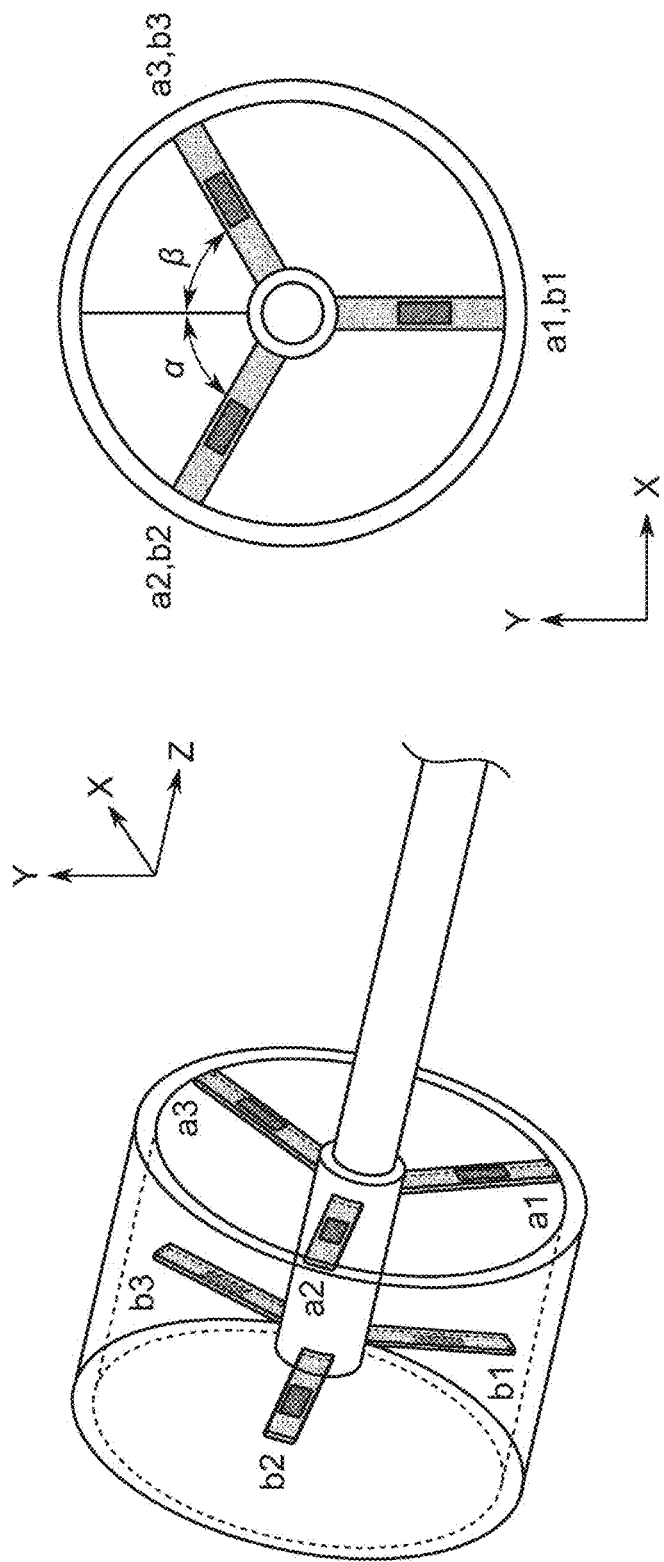
FIG. 23 is a diagram illustrating a structure of a three-direction strain generating body.

Additionally, estimation equations of the external forces $F_X$, $F_Y$, and $F_Z$ in the case of a three-direction strain generating body in which three legs of the strain generating body-a layer 811 are a1 to a3, respectively, and three legs of the strain generating body-b layer 812 are b1 to b3, respectively, as illustrated in FIG. 23 are as shown in the following equations (6) to (8), respectively. Where $\Delta_1 = \varepsilon_{b1} - \varepsilon_{a1}$, $\Delta_2 = \varepsilon_{b2} - \varepsilon_{a2}$, and $\Delta_3 = \varepsilon_{b3} - \varepsilon_{a3}$.

[Expression 6]

$$F_X = K_X\left(\frac{\Delta_3}{\sin\beta} - \frac{\Delta_2}{\sin\alpha}\right) \quad (6)$$

[Expression 7]

$$F_Y = K_Y\left(\frac{\Delta_2}{\cos a} + \frac{\Delta_3}{\cos\alpha} - \Delta_1\right) \quad (7)$$

[Expression 8]

$$F_Z = K_Z(\Delta_1 + \Delta_2 + \Delta_3) \quad (8)$$

Figure 24:
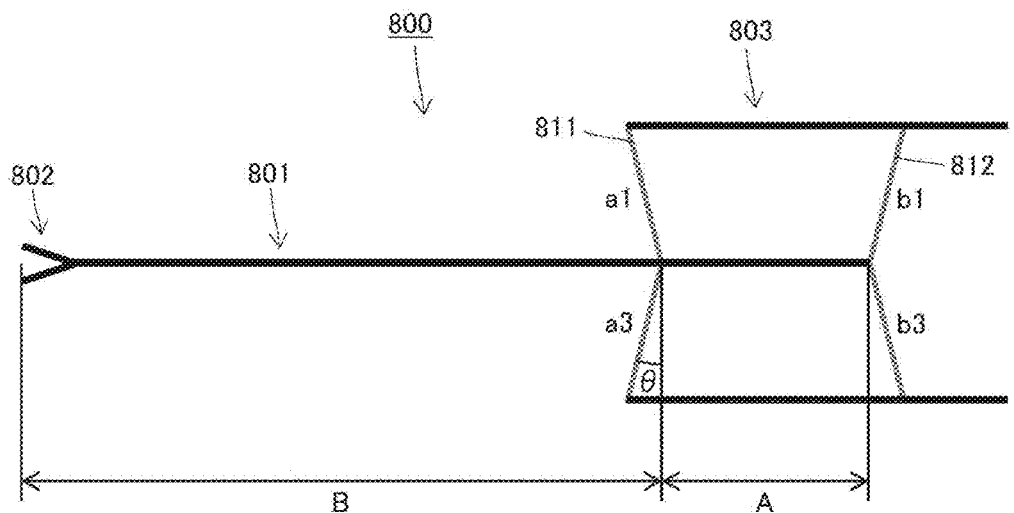
FIG. 24 is a diagram illustrating abstracted structuring of the surgical instrument unit 800.

Next, a method of deriving $K_Y$ will be described (case of four-direction strain generating body). The coefficient $K_Y$ represents the sensitivity in the Y direction of the strain sensor using the strain generating body-a layer 811 and the strain generating body-b layer 812. Here, the structure of the surgical instrument unit 800 is abstracted as illustrated in FIG. 24. In FIG. 24, a distance between the strain generating body-a layer 811 and the strain generating body-b layer 812 is A, and a distance from the tip end of the shaft 801 (or end effector 802) to the strain generating body-a layer 811 is B. Additionally, the strain generating body-a layer 811 is inclined at an angle θ with respect to a plane (or Y axis) orthogonal to the Z axis, and the strain generating body-b layer 812 is inclined at an angle −θ with respect to the plane (or Y axis) orthogonal to the Z axis.

Figure 25:
FIG. 25 is a diagram illustrating a force acting in the Y direction of the surgical instrument unit 800 illustrated in FIG. 24.

Here, as illustrated in FIG. 25, a tip end force acting in the Y direction at the tip end of the end effector 802 is defined as $F_Y$, an estimated value of the tip end force of the end effector 802 is defined as $F_{Y\_pre}$, a force in the Y direction applied to the strain generating body-a layer 811 is defined as $F_{Y1}$, and a force in the Y direction applied to the strain generating body-b layer 812 is defined as $F_{Y2}$. Additionally, thicknesses of the strain generating body-a layer 811 and the strain generating body-b layer 812 are denoted by t, widths of the strain generating body-a layer 811 and the strain generating body-b layer 812 are denoted by w, and Young's moduli of the strain generating body-a layer 811 and the strain generating body-b layer 812 are denoted by E.

From the balance between the force and the moment, the force $F_{Y1}$ in the Y direction applied to the strain generating body-a layer 811 and the force $F_{Y2}$ in the Y direction applied to the strain generating body-b layer 812 are expressed as the following equations (9) and (10), respectively.

[Expression 9]

$$F_{Y1} = \frac{B}{A}F_Y \quad (9)$$

[Expression 10]

$$F_{Y2} = \frac{A+B}{A}F_Y \quad (10)$$

From the relationship between the force and the strain, the strain amounts $\varepsilon_{a1}$ and $\varepsilon_{a1}$ of the legs a1 and a3 of the strain generating body-a layer 811 and the strain amounts $\varepsilon_{b1}$ and $\varepsilon_{b1}$ of the legs b1 and b3 of the strain generating body-b layer 812 are as shown in the following equations (11) and (12), respectively.

[Expression 11]

$$-\varepsilon_{a1} = \varepsilon_{a3} = \frac{F_{Y2}}{2\cdot(twE)\cdot\cos\theta} = \frac{A+B}{2A\cdot(twE)\cdot\cos\theta}F_Y \quad (11)$$

[Expression 12]

$$\varepsilon_{b1} = -\varepsilon_{b3} = \frac{F_{Y1}}{2\cdot(fwE)\cdot\cos\theta} = \frac{B}{2A\cdot(twE)\cdot\cos\theta}F_Y \quad (12)$$

The estimated value $F_{Y\_pre}$ of the tip end force $F_Y$ of the end effector 802 is expressed by the following equation (13).

[Expression 13]

$$F_{Y\_pre} = K_Y((\varepsilon_{b1} - \varepsilon_{a1}) - (\varepsilon_{b3} - \varepsilon_{a3})) \quad (13)$$
$$= K_Y\left\{\frac{B}{A\cdot(twE)\cdot\cos\theta}F_Y + \frac{A+B}{A\cdot(twE)\cdot\cos\theta}F_Y\right\}$$
$$= K_Y\frac{A+2B}{A\cdot(twE)\cdot\cos\theta}F_Y$$

When the estimated value $F_{Y\_pre}$ of the tip end force of the end effector 802 is equal to the tip end force $F_Y$ acting in the Y direction at the tip end of the end effector 802, that is, when $F_{Y\_pre} = F_Y$ holds, $K_Y$ is expressed by the following equation (14).

[Expression 14]

$$K_Y = \frac{A\cdot(twE)\cdot\cos\theta}{A+2B} \quad (14)$$

Note that although not described, $K_X$ is also expressed by the above equation (14). The coefficient $K_X$ represents the sensitivity in the X direction of the strain sensor using the strain generating body-a layer 811 and the strain generating body-b layer 812.

Figure 26:
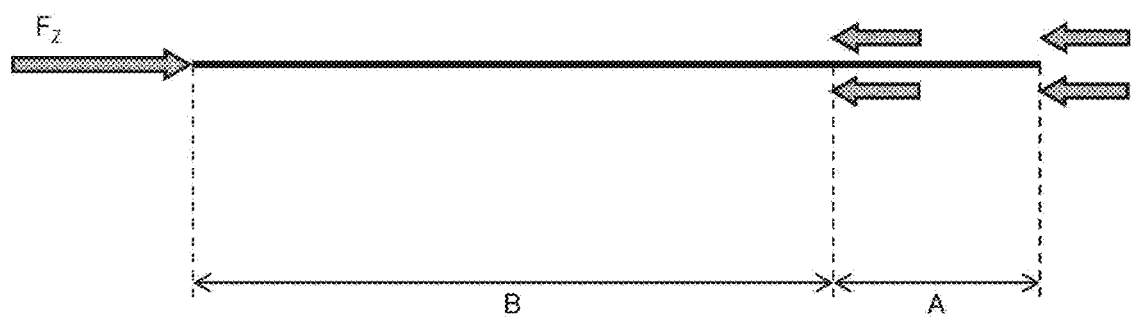
FIG. 26 is a diagram illustrating a force acting in the Z direction of the surgical instrument unit 800 illustrated in FIG. 24.

Next, a method of deriving $K_Z$ will be described (case of four-direction strain generating body). The coefficient $K_Z$ represents the sensitivity in the Z direction of the strain sensor using the strain generating body-a layer 811 and the strain generating body-b layer 812. Here, the structure of the surgical instrument unit 800 is abstracted as illustrated in FIG. 24 (the same as above). Here, as illustrated in FIG. 26, a tip end force $F_Z$ acting in the Z direction at the tip end of the end effector 802 is evenly distributed.

From the relationship between the force and the strain, the strain amounts $\varepsilon_{a1}$ and $\varepsilon_{a1}$ of the legs a1 and a3 of the strain generating body-a layer 811 and the strain amounts $\varepsilon_{b1}$ and $\varepsilon_{b1}$ of the legs b1 and b3 of the strain generating body-b layer 812 are as shown in the following equation (15).

[Expression 15]

$$-\varepsilon_{a1} = -\varepsilon_{a3} = \varepsilon_{b1} = \varepsilon_{b3} = \frac{1}{4 \cdot (twE) \cdot \cos\theta} F_Z \tag{15}$$

An estimated value $F_{Z\_pre}$ of the tip end force $F_Z$ of the end effector 802 is expressed by the following equation (16).

[Expression 16]

$$F_{Z\_pre} = K_Z((\varepsilon_{b1} - \varepsilon_{a1}) - (\varepsilon_{b3} - \varepsilon_{a3})) \tag{16}$$

$$= K_Z \frac{1}{(twE) \cdot \sin\theta} F_Z$$

When the estimated value $F_{Z\_pre}$ of the tip end force of the end effector 802 is equal to the tip end force $F_Z$ acting in the Z direction at the tip end of the end effector 802, that is, when $F_{Z\_pre} = F_Z$ holds, $K_Z$ is expressed by the following equation (17).

[Expression 17]

$$K_Z = (twE) \cdot \sin\theta \tag{17}$$

Next, a condition that $K_Y = K_Z$ holds will be described. From the above equations (14) and (17), the ratio of $K_Y$ to $K_Z$ is expressed as the following equation (18).

[Expression 18]

$$\frac{K_Z}{K_Y} = (twE) \cdot \sin\theta \cdot \frac{A + 2B}{A \cdot (twE) \cdot \cos\theta} = \frac{(A + 2B)\sin\theta}{A \cdot \cos\theta} \tag{18}$$

Therefore, a condition that $K_Y = K_Z$ holds is that the parameters $\theta$, A, and B satisfy the following equation (19).

[Expression 19]

$$\tan\theta = \frac{A}{A + 2B} \tag{19}$$

From the above equations (14) and (17), by forming the cross sections of the strain generating body-a layer 811 and the strain generating body-b layer 812 in the "chevron" shape, an effect that the sensitivity of the strain sensor can be adjusted by the inclination $\theta$ of the strain generating body-a layer 811 and the strain generating body-b layer 812 is derived. Features of the strain sensor according to the present disclosure will be described below.

(a) The sensitivity balance between $K_Z$ and $K_X$ or $K_Y$ can be adjusted by changing the inclination $\theta$ of the strain generating body.

(b) The sensitivity of $K_X$ and $K_Y$ can be adjusted by the ratio of the distance A from the tip end of the shaft 801 to the strain generating body-a layer 811 and the distance B between the strain generating body-a layer 811 and the strain generating body-b layer 812.

(c) By setting the distance A from the tip end of the shaft 801 to the strain generating body-a layer 811 to an appropriate distance, it is possible to arrange the cable between the strain generating body-a layer 811 and the strain generating body-b layer 812.

(d) It is possible to produce a strain generating body using sheet metal. Sheet metal has high accuracy of thickness t and low cost, and can produce a strain generating body having a desired shape by laser processing.

E. Mounting Example of Strain Generating Body

FIG. 27 illustrates a configuration example (front view and perspective view) of a strain generating body that can be used as the strain generating body-a layer 811 and the strain generating body-b layer in the surgical instrument unit according to the present disclosure. The strain generating body in FIG. 27 has a structure of a four-direction strain generating body in which a shaft (not illustrated in FIG. 27) is supported by four legs. This is a result of determining the shape of the strain generating body with optimum sensitivity by finite element method (FEM) analysis. Referring to FIG. 27, a mesh shape is formed near the center of each of the four legs, and is configured to be more easily strained than other parts of the leg. Then, an optical fiber included in the FBG sensor is attached to each of the four legs, and a grating is formed on the optical fiber in a part overlapping the mesh shape to dispose the FBG sensor.

FIG. 28 illustrates another configuration example (front view and perspective view) of a strain generating body that can be used as the strain generating body-a layer 811 and the strain generating body-b layer in the surgical instrument unit according to the present disclosure. The strain generating body in FIG. 28 has a structure of a four-direction strain generating body in which a shaft (not illustrated in FIG. 28) is supported by four legs. Two openings cut out in the longitudinal direction are formed near the center of each of the four legs, and are configured to be more easily strained than other parts of the leg. Then, an optical fiber on which a grating serving as an FBG sensor is formed is attached between the two openings of each leg.

FIG. 29 illustrates still another configuration example (front view and perspective view) of a strain generating body that can be used as the strain generating body-a layer 811 and the strain generating body-b layer in the surgical instrument unit according to the present disclosure. The strain generating body in FIG. 28 has a structure of a four-direction strain generating body in which a shaft (not illustrated in FIG. 28) is supported by four legs. An optical fiber on which a grating serving as an FBG sensor is formed is attached to each of the four legs.

FIG. 30 illustrates still another configuration example (front view and perspective view) of a strain generating body that can be used as the strain generating body-a layer 811 and the strain generating body-b layer in the surgical instrument unit according to the present disclosure. The strain generating body in FIG. 30 has a structure of a four-direction strain generating body in which a shaft (not illustrated in FIG. 30) is supported by four legs. Each of the four legs is thin with both ends near the center scraped off, and is configured to be more easily strained than other parts of the leg. Then, an optical fiber on which a grating serving as an FBG sensor is formed is attached to the thin part of each leg.

FIG. 31 illustrates still another configuration example (front view and perspective view) of a strain generating body that can be used as the strain generating body-a layer 811 and the strain generating body-b layer in the surgical instrument unit according to the present disclosure. The strain generating body in FIG. 31 has a structure of a four-direction strain generating body in which a shaft (not illustrated in FIG. 31) is supported by four legs. A folding structure is formed near the center of each of the four legs, and is configured to be more easily strained than other parts of the leg. Then, an optical fiber on which a grating serving as an FBG sensor is formed is attached to the part of the folding structure of each leg.

In a case where sheet metal such as SUS is used as a material for the strain generating body, a strain generating body with a highly accurate thickness t and having a shape as illustrated in FIGS. 27 to 31 can be manufactured at low cost by laser processing.

F. Specific Structure and Assembling Method of Surgical Instrument Unit

Figure 32:
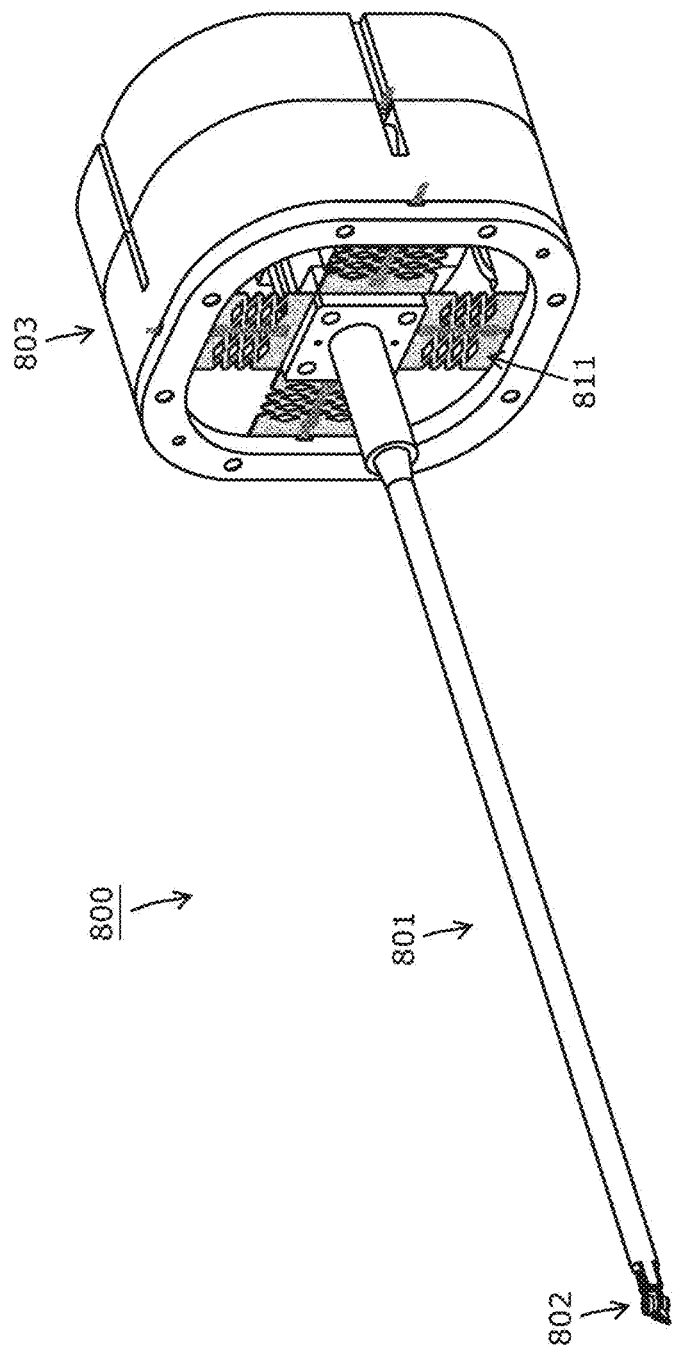
FIG. 32 is a diagram illustrating a perspective view of a surgical instrument unit 800 using the strain generating body illustrated in FIG. 27 for a strain generating body-a layer 811 and a strain generating body-b layer 812.
Figure 33:
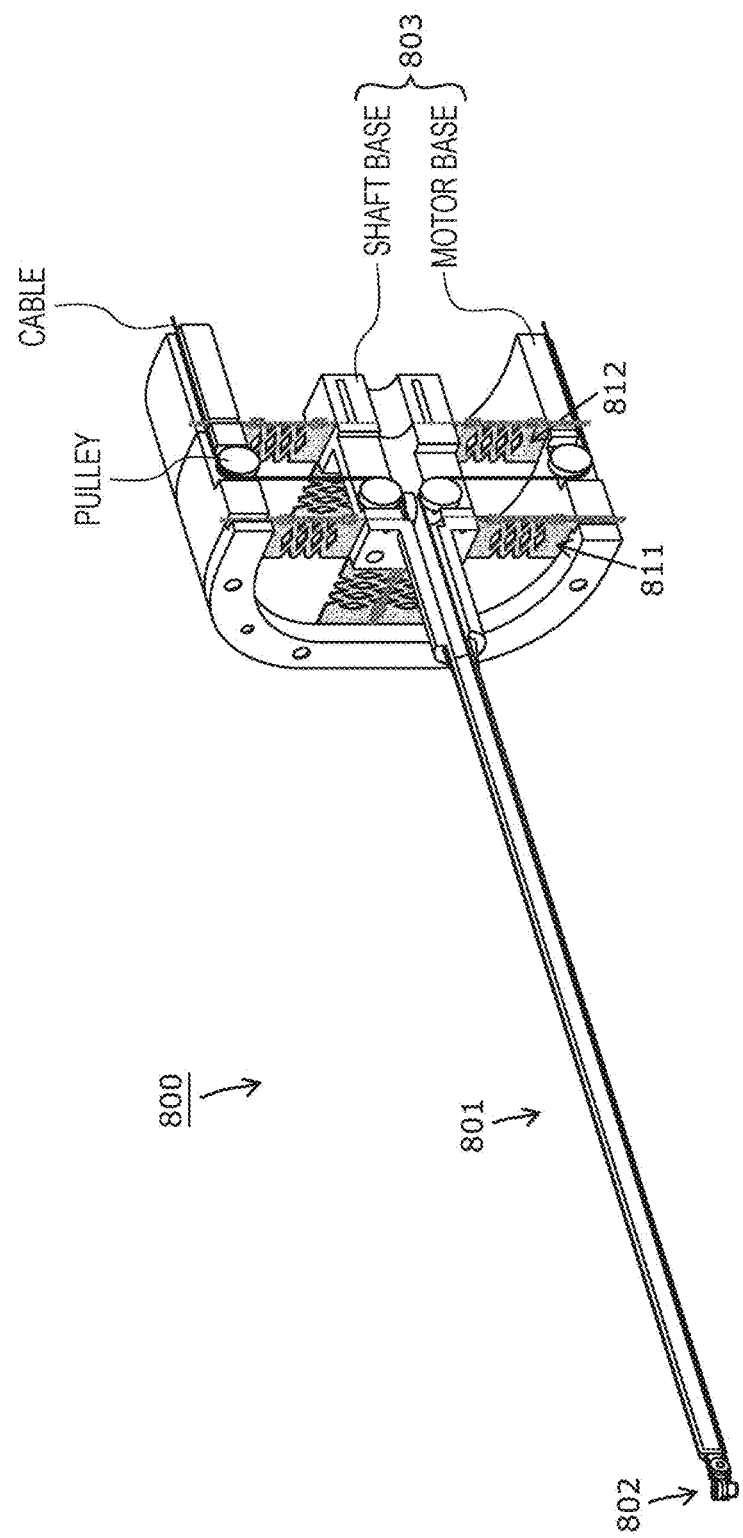
FIG. 33 is a diagram illustrating a cross section of a part of a base 803 of the surgical instrument unit 800 illustrated in FIG. 32.

FIG. 32 illustrates a perspective view of a surgical instrument unit 800 using the strain generating body illustrated in FIG. 27 for the strain generating body-a layer 811 and the strain generating body-b layer 812. Additionally, FIG. 33 illustrates a cross-sectional view of a part of a base 803 of the surgical instrument unit 800 illustrated in FIG. 32.

The base 803 is divided into a hollow outer motor base to which a motor for pulling a cable is attached on the root side (not illustrated) and a shaft base to which a shaft 801 is attached near the center of the motor base. Then, the shaft base is attached to the motor base via the strain generating body-a layer 811 and the strain generating body-b layer 812.

Figure 34:
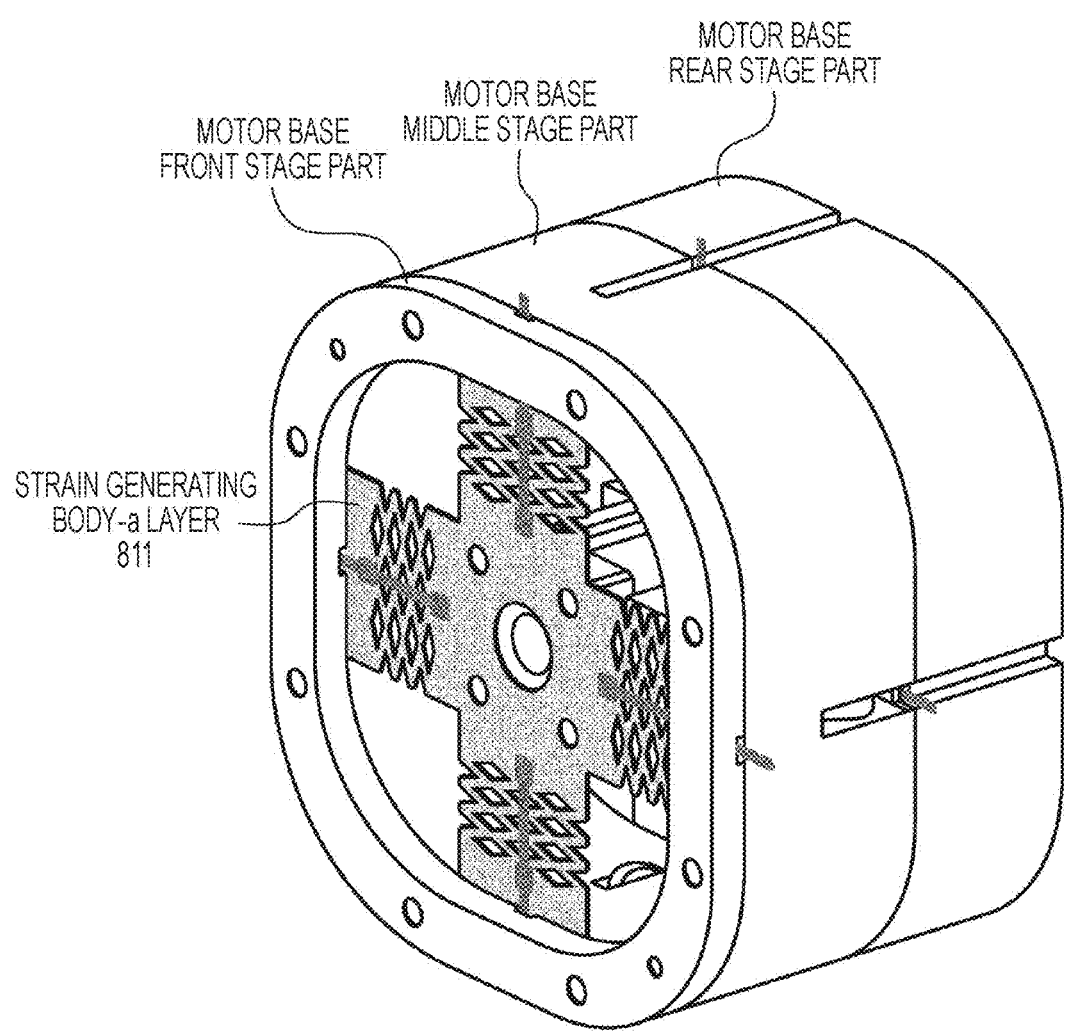
FIG. 34 is a diagram illustrating a perspective view of a part of the base 803 before assembly.
Figure 35:
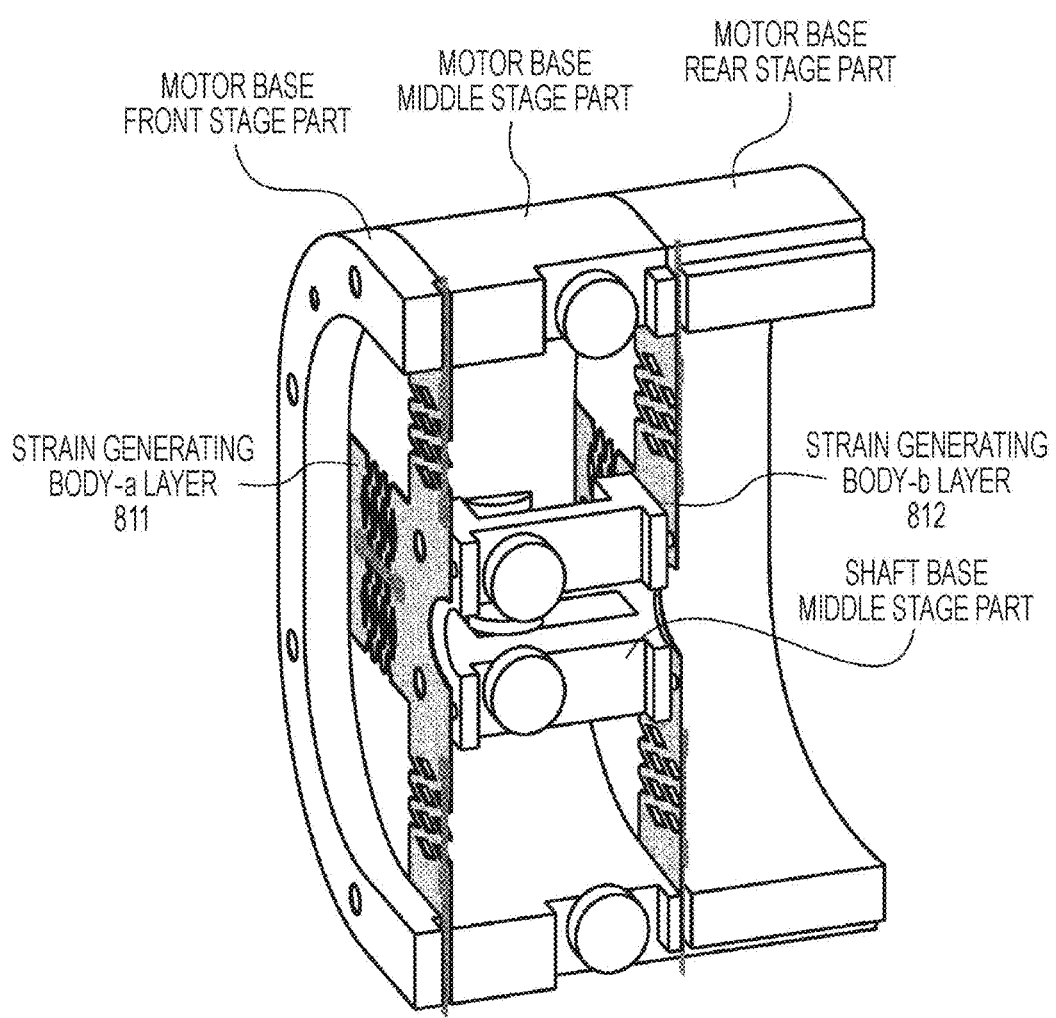
FIG. 35 is a diagram illustrating a perspective cross-sectional view of a part of the base 803 before assembly.
Figure 36:
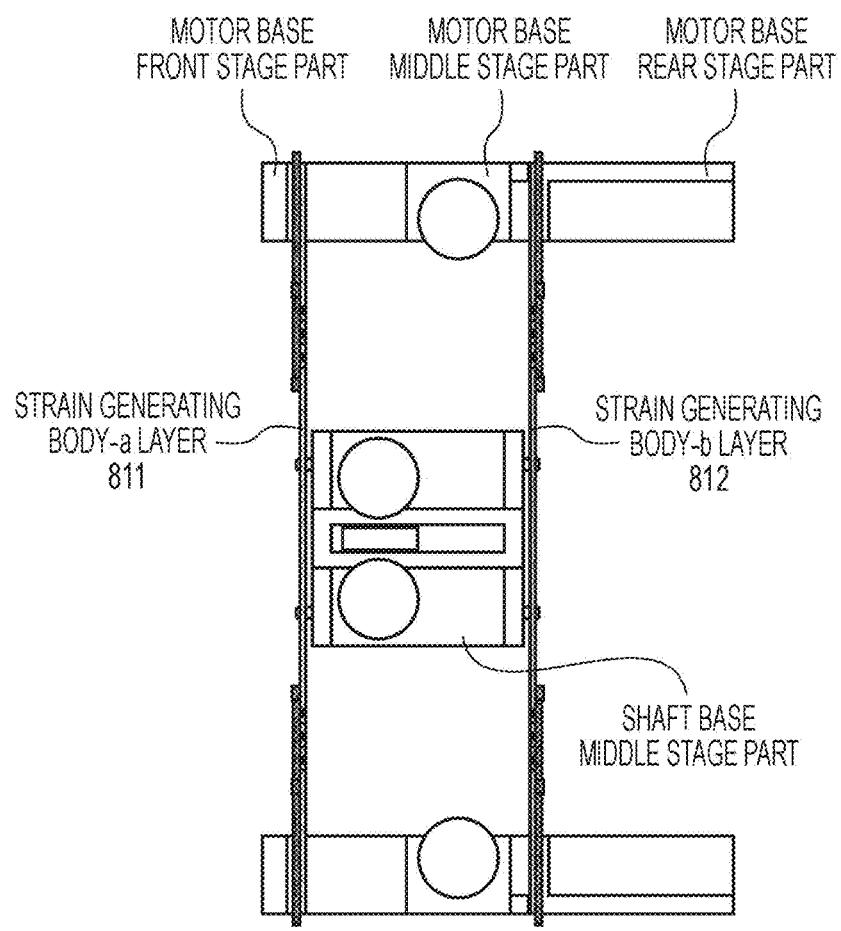
FIG. 36 is a diagram illustrating a cross-sectional view of a part of the base 803 before assembly.
Figure 37:
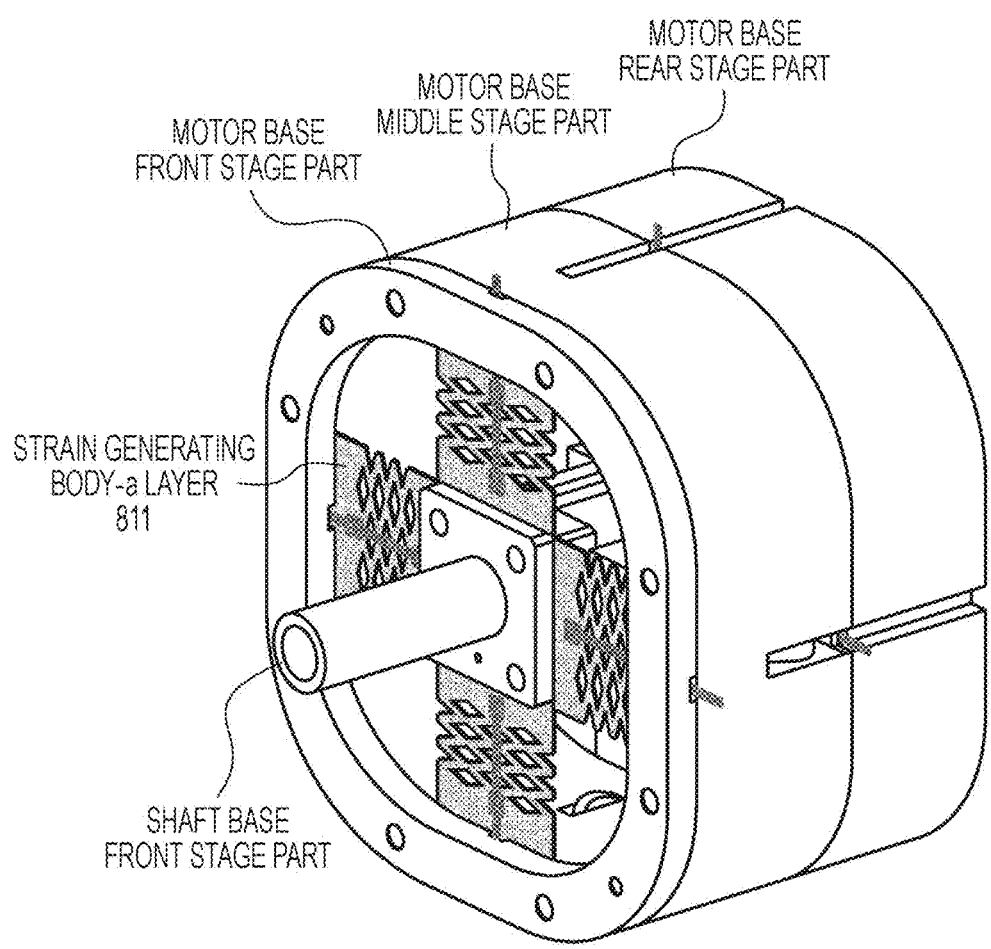
FIG. 37 is a diagram illustrating a perspective view of a part of the base 803 after assembly.
Figure 38:
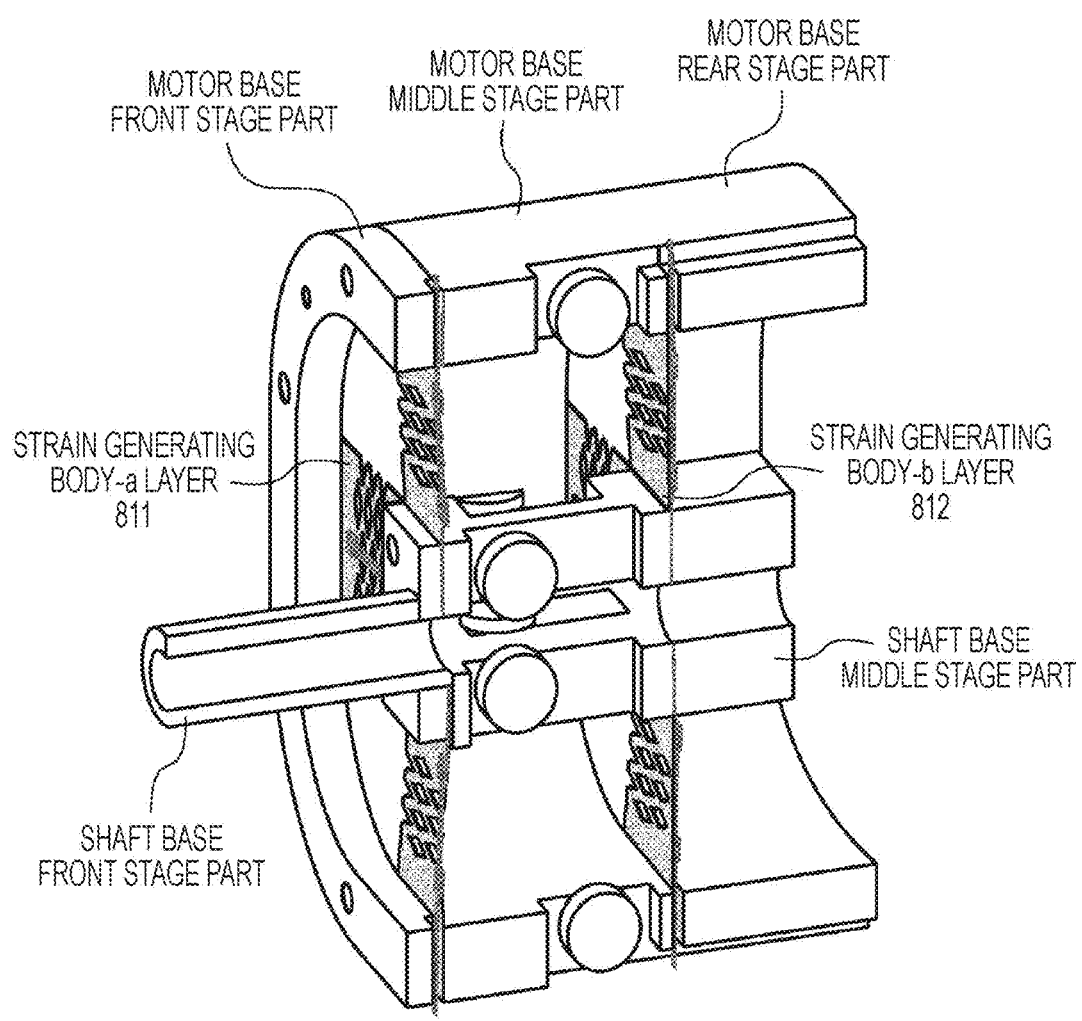
FIG. 38 is a diagram illustrating a cross-sectional perspective view of a part of the base 803 after assembly.
Figure 39:
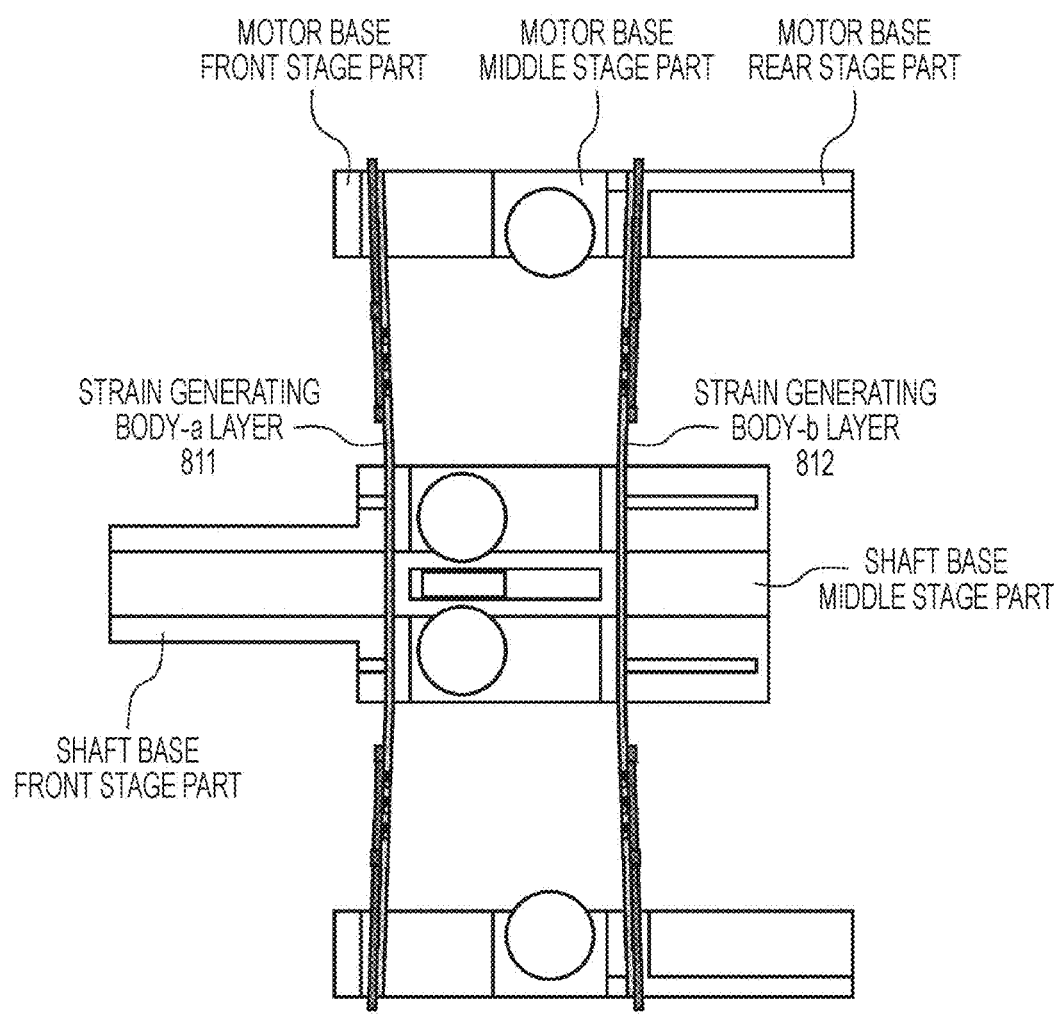
FIG. 39 is a diagram illustrating a cross-sectional view of a part of the base 803 after assembly.

FIGS. 34 to 36 show a perspective view, a cross-sectional perspective view, and a cross-sectional view of a part of the base 803 before assembly, respectively. Additionally, FIGS. 37 to 39 show a perspective view, a cross-sectional perspective view, and a cross-sectional view of a part of the base 803 after assembly (or after incorporating strain generating body).

The motor base is divided into three parts: a front stage part of the motor base on the tip end side; a rear stage part of the motor base on the root side; and a middle stage part of the motor base sandwiched between the front stage part of the motor base and the rear stage part of the motor base. Additionally, the shaft base is divided into three parts: a front stage part of the shaft base on the tip end side; a rear stage part of the shaft base on the root side; and a middle stage part of the shaft base sandwiched between the front stage part of the shaft base and the rear stage part of the shaft base.

In the assembly process, as can be seen from FIGS. 35 and 36, the shaft base middle stage part is sandwiched near the centers of the strain generating body-a layer 811 and the strain generating body-b layer 812, and the motor base middle stage part is sandwiched between the peripheral edges of the strain generating body-a layer 811 and the strain generating body-b layer 812. Additionally, the peripheral edge of the strain generating body-a layer 811 is sandwiched between the motor base front stage part and the motor base middle stage part, and the peripheral edge of the strain generating body-b layer 812 is sandwiched between the motor base middle stage part and the motor base rear stage part. The motor base front stage part, the motor base middle stage part, and the motor base rear stage part are screwed using screws, for example, but other fixing methods may be used.

Note that in this state, the strain generating body-a layer 811 and the strain generating body-b layer 812, as well as the FBG sensors attached to the strain generating body-a layer 811 and the strain generating body-b layer 812, are in a natural length state in which no pre-tension is applied. Additionally, as can be seen from FIG. 36, in this state, the cross sections of the strain generating body-a layer 811 and the strain generating body-b layer 812 are substantially parallel and do not form a "chevron" shape. Additionally the vicinity of the center of the strain generating body-a layer 811 and a front surface of the shaft base middle stage part, and the vicinity of the center of the strain generating body-b layer 812 and a back surface of the shaft base middle stage part are not in contact with each other but are separated from each other.

Next, as can be seen from FIGS. 38 and 39, the vicinity of the center of the strain generating body-a layer 811 is sandwiched between the shaft base front stage part and the shaft base middle stage part, and the vicinity of the center of the strain generating body-b layer 812 is sandwiched between the shaft base middle stage part and the shaft base rear stage part. The shaft base front stage part, the shaft base middle stage part, and the shaft base rear stage part are screwed using screws, for example, but other fixing methods may be used. Although omitted in FIGS. 37 to 39, the shaft 801 of the surgical instrument unit 800 is used by being inserted into the tip end of the shaft base front stage part.

As can be seen from FIGS. 36 and 39, the longitudinal dimension of the shaft base middle stage part is shorter than the longitudinal dimension of the motor base middle stage part. Therefore, as shown in FIGS. 37 to 39, when the shaft base front stage part is attached to the front center of the strain generating body-a layer 811 and pressed against the front surface of the shaft base middle stage part, and the shaft base rear stage part is attached to the rear center of the strain generating body-b layer 812 and pressed against the back surface of the shaft base middle stage part, the cross sections of the strain generating body-a layer 811 and the strain generating body-b layer 812 form a "chevron" shape. In this state, pre-tension is applied to the strain generating body-a layer 811 and the strain generating body-b layer 812, as well as the FBG sensors attached to the strain generating body-a layer 811 and the strain generating body-b layer 812. When pre-tension is applied to the strain generating body and the FBG sensor, there is an effect that buckling hardly occurs when a compressive force is applied.

INDUSTRIAL APPLICABILITY

The present disclosure has been described in detail above with reference to specific embodiments. However, it is self-evident a person skilled in the art can modify or substitute the embodiments without departing from the gist of the present disclosure.

In the present specification, the embodiment in which the present disclosure is applied to a surgical instrument used in a surgical robot has been mainly described, but the gist of the present disclosure is not limited thereto. The present disclosure can be applied to robots in various fields other than medical care, such as precision working robots.

In short, the present disclosure has been described in the form of exemplification, but the content described in the present specification should not be interpreted in a limited manner. In order to determine the gist of the present disclosure, the claims should be taken into consideration.

Note that the present disclosure can also be configured as follows.

(1) A surgical instrument unit including:
a shaft having an end effector at a tip end;
a hollow base; and
a strain generating part that supports a root part of the shaft in the base.

(2) The surgical instrument unit according to (1) above, in which
the shaft allows passage of a cable for driving the end effector, and
a motor that pulls the cable is arranged in the base.

(3) The surgical instrument unit according to (1) or (2) above, in which
the strain generating part includes a first-layer strain generating body and a second-layer strain generating body arranged in order in a long axis direction of the shaft.

(4) The surgical instrument unit according to (3) above, in which
each of the first strain generating body and the second strain generating body is a multidirectional strain generating body that supports a root part of the shaft with respect to an inner wall of the base with a plurality of legs from a plurality of directions.

(5) The surgical instrument unit according to (4) above 4, in which
each leg of the first strain generating body is inclined by a predetermined angle θ with respect to a plane orthogonal to a long axis of the shaft, and each leg of the second strain generating body is inclined by an angle −θ opposite to each leg of the first strain generating body with respect to the plane.

(6) The surgical instrument unit according to (5) above, in which
a strain sensor is attached to each leg of the first strain generating body and the second strain generating body.

(7) The surgical instrument unit according to (6) above, in which
a strain mode of the shaft or the end effector is determined on the basis of a strain amount of each leg.

(8) The surgical instrument unit according to (7) above, in which
in a case where extending and contracting directions of a leg of the first strain generating body and a leg of the second strain generating body in the same position coincide with each other, it is determined to be a cable traction mode in which strain occurs due to traction of a cable pulling the end effector.

(9) The surgical instrument unit according to (7) above, in which
in a case where extending and contracting directions of legs of the first strain generating body coincide with each other and the extending and contracting directions of legs of the second strain generating body coincide with each other, but the extending and contracting directions of the legs of the first strain generating body and the legs of the second strain generating body are reversed, it is determined to be a mode in which strain occurs due to an external force acting in a longitudinal direction of the shaft.

(10) The surgical instrument unit according to (7) above, in which
in a case where extending and contracting directions of legs facing each other are reversed in each of the first strain generating body and the second strain generating body, it is determined to be a mode in which strain occurs due to an external force acting in a direction orthogonal to a longitudinal direction of the shaft.

(11) The surgical instrument unit according to any one of (6) to (10) above, in which
the strain sensor includes an FBG sensor.

(12) The surgical instrument unit according to any one of (2) to (11) above in which
the first strain generating body and the second strain generating body include sheet metal.

(13) The surgical instrument unit according to any one of (6) to (12) above in which
pre-tension is applied to the first strain generating body, the second strain generating body, and the strain sensor.

(14) A force detection device including
a strain generating part that supports a shaft in a hollow base, and
a strain sensor that detects strain in the strain generating part.

(14-2) The force detection device according to (14) above, in which
the shaft allows passage of a cable for driving the end effector, and
a motor that pulls the cable is arranged in the base.

(14-3) The force detection device according to (14) or (14-2) above, in which
the strain generating part includes a first-layer strain generating body and a second-layer strain generating body arranged in order in a long axis direction of the shaft.

(14-4) The force detection device according to (14-3) above, in which
each of the first strain generating body and the second strain generating body is a multidirectional strain generating body that supports a root part of the shaft with respect to an inner wall of the base with a plurality of legs from a plurality of directions.

(14-5) The force detection device according to (14-4) above, in which
each leg of the first strain generating body is inclined by a predetermined angle θ with respect to a plane orthogonal to a long axis of the shaft, and each leg of the second strain generating body is inclined by an angle −θ opposite to each leg of the first strain generating body with respect to the plane.

(14-6) The force detection device according to (14-5) above, in which
a strain sensor is attached to each leg of the first strain generating body and the second strain generating body.

(14-7) The force detection device according to (14-6) above, in which
a strain mode of the shaft or the end effector is determined on the basis of a strain amount of each leg.

(14-8) The force detection device according to (14-7) above, in which
in a case where extending and contracting directions of a leg of the first strain generating body and a leg of the second strain generating body in the same position coincide with each other, it is determined to be a cable traction mode in which strain occurs due to traction of a cable pulling the end effector.

(14-9) The force detection device according to (14-7) above, in which
in a case where extending and contracting directions of legs of the first strain generating body coincide with each other and the extending and contracting directions of legs of the second strain generating body coincide with each other, but the extending and contracting directions of the legs of the first strain generating body and the legs of the second strain generating body are reversed, it is determined to be a mode in which strain occurs due to an external force acting in a longitudinal direction of the shaft.

(14-10) The force detection device according to (14-7) above, in which
in a case where extending and contracting directions of legs facing each other are reversed in each of the first strain generating body and the second strain generating body, it is determined to be a mode in which strain occurs due to an external force acting in a direction orthogonal to a longitudinal direction of the shaft.

(14-11) The force detection device according to any one of (14-6) to (14-10) above, in which
the strain sensor includes an FBG sensor.

(14-12) The force detection device according to any one of (14-2) to (14-11) above, in which
the first strain generating body and the second strain generating body include sheet metal.

(14-13) The force detection device according to any one of (14-6) to (14-12) above, in which
pre-tension is applied to the first strain generating body, the second strain generating body, and the strain sensor.

(15) A surgery support system including
a surgical instrument and an arm to which the surgical instrument is attached, in which
the surgical instrument includes a shaft having an end effector at a tip end, a hollow base, and a strain generating part that supports a root part of the shaft in the base.

REFERENCE SIGNS LIST

1 Surgery supporting robot
11 Surgical instrument unit
12 Arm
100 Surgical instrument unit
101 Surgical instrument unit tip end part
102 Shaft
103 Surgical instrument unit driver
800 Surgical instrument unit
801 Shaft
802 End effector
803 Base
811 Strain generating body-a layer
812 Strain generating body-b layer
1401, 1402 Three-direction strain generating body
1501, 1502 Five-direction strain generating body

The invention claimed is:

1. A surgical instrument unit comprising:
a hollow shaft having an end effector at a tip end;
a cable passing in the hollow shaft and driving the end effector;
a hollow base;
a motor in the hollow base for pulling the cable;
a first-layer strain body and a second-layer strain body arranged in order along a long axis of the hollow shaft, each of the first-layer strain body and the second-layer strain body having a plurality of legs which extend between the hollow shaft and an inner wall of the hollow base at circumferential positions with equal intervals about the long axis of the hollow shaft and support a root part of the hollow shaft in the hollow base; and
a strain sensor attached to each of the legs of the first-layer strain body and the second-layer strain body, the strain sensor detecting a strain amount of a corresponding one of the legs when an external force is applied to the end effector, wherein
under an initial condition where the external force is not applied to the end effector, each of the legs of the first-layer strain body is inclined by a predetermined angle θ with respect to a plane orthogonal to the long axis of the hollow shaft while each of the legs of the second-layer strain body is inclined by an angle −θ opposite to each corresponding one of the legs of the first-layer strain body with respect to the plane.

2. The surgical instrument unit according to claim 1 further comprising:
a signal processing device configured to determine a strain mode of the hollow shaft or the end effector on a basis of a strain amount of each of the legs.

3. The surgical instrument unit according to claim 2, wherein
in a case where extending and contracting directions of a leg of the first-layer strain body and a leg of the second-layer strain body at a same circumferential position coincide with each other, the signal processing device is further configured to determine that the strain mode is a cable traction mode in which strain occurs due to traction of the cable driving the end effector.

4. The surgical instrument unit according to claim 2, wherein
in a case where extending and contracting directions of the legs of the first-layer strain body coincide with each other and extending and contracting directions of the legs of the second-layer strain body coincide with each other, but the extending and contracting directions of the legs of the first-layer strain body and the legs of the second-layer strain body are opposite, the signal processing device is further configured to determine that the strain mode is a mode in which strain occurs due to an external force acting in a longitudinal direction of the hollow shaft.

5. The surgical instrument unit according to claim 2, wherein
in a case where extending and contracting directions of legs facing each other are opposite in each of the first-layer strain body and the second-layer strain body, the signal processing device is further configured to determine that the strain mode is a mode in which strain occurs due to an external force acting in a direction orthogonal to a longitudinal direction of the hollow shaft.

6. The surgical instrument unit according to claim 1, wherein
the strain sensor includes a fiber Bragg grating (FBG) sensor.

7. The surgical instrument unit according to claim 1, wherein
the first-layer strain body and the second-layer strain body include sheet metal.

8. The surgical instrument unit according to claim 1, wherein
the first-layer strain body, the second-layer strain body, and the strain sensor are tense.

9. A surgery support system comprising:
a surgical instrument; and
an arm to which the surgical instrument is attached, wherein the surgical instrument includes
- a hollow shaft having an end effector at a tip end,
- a cable passing in the hollow shaft and driving the end effector,
- a hollow base,
- a motor in the hollow base for pulling the cable,
- a first-layer strain body and a second-layer strain body arranged in order along a long axis of the hollow shaft, each of the first-layer strain body and the second-layer strain body having a plurality of legs which extend between the hollow shaft and an inner wall of the hollow base at circumferential positions with equal intervals about the long axis of the hollow shaft and support a root part of the hollow shaft in the hollow base, and
- a strain sensor attached to each of the legs of the first-layer strain body and the second-layer strain body, the strain sensor detecting a strain amount of a corresponding one of the legs when an external force is applied to the end effector, wherein
- under an initial condition where the external force is not applied to the end effector, each of the legs of the first-layer strain body is inclined by a predetermined angle $\theta$ with respect to a plane orthogonal to the long axis of the hollow shaft while each of the legs of the second-layer strain body is inclined by an angle $-\theta$ opposite to each corresponding one of the legs of the first-layer strain body with respect to the plane.

* * * * *